(12) United States Patent
Hatori

(10) Patent No.: US 6,553,382 B2
(45) Date of Patent: *Apr. 22, 2003

(54) DATA MANAGEMENT SYSTEM FOR RETRIEVING DATA BASED ON HIERARCHIZED KEYWORDS ASSOCIATED WITH KEYWORD NAMES

(75) Inventor: Kenji Hatori, Hatogaya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/615,782

(22) Filed: Mar. 14, 1996

(65) Prior Publication Data

US 2003/0037058 A1 Feb. 20, 2003

(30) Foreign Application Priority Data

Mar. 17, 1995 (JP) .............................................. 7-058467

(51) Int. Cl.[7] .............................................. G06F 17/00
(52) U.S. Cl. .............................. 707/102; 707/3; 707/4; 707/5; 707/7
(58) Field of Search ................................ 395/601–605, 395/773–776; 364/228–284; 707/1–206

(56) References Cited

U.S. PATENT DOCUMENTS

| | | | | |
|---|---|---|---|---|
| 4,554,631 A | * | 11/1985 | Reddington | 364/300 |
| 5,347,632 A | * | 9/1994 | Filepp et al. | 395/200 |
| 5,428,778 A | * | 6/1995 | Brookes | 395/600 |
| 5,467,471 A | * | 11/1995 | Bader | 395/600 |
| 5,537,528 A | * | 7/1996 | Takahashi et al. | 395/773 |

OTHER PUBLICATIONS www.metapsy.com/top.html.*

US Dept. of Commerce, "Text search and retrieval reference manual for th APS", pp. 28–32, Dec. 1994.*

* cited by examiner

Primary Examiner—David Jung
(74) Attorney, Agent, or Firm—Fitzpatrick, Cella, Harper & Scinto

(57) ABSTRACT

This invention provides a data management method and a data management system for automatically merging hierarchical keywords and attribute information into other hierarchical keywords and attribute information, and reducing the work of adding keywords to data. When first and second hierarchized keyword groups are given, keywords having the same keyword name or keywords equal in keyword names of all parents are extracted from the first and second keyword groups. A logical operation is performed for the extracted keywords, by using the keyword names, between a set of keywords immediately below a parent keyword in the first keyword group and a set of keywords immediately below a parent keyword in the second keyword group. On the basis of the logical operation, one hierarchized keyword group consisting of the keywords in the first keyword group and the keywords in the second keyword group is formed.

16 Claims, 26 Drawing Sheets

FIG. 2

| FILE NAME | TITLE | PIXEL NUMBER | COLOR NUMBER | KEYWORD ID | STORAGE LOCATION |
|---|---|---|---|---|---|
| 30 | 31 | 32 | 33 | 34 | 36 |
| trip. bmp | IZU TOUR | 640 × 480 | 256 | #10 | C:¥image |
| friend. tif | COLLEAGUE | 1024 × 768 | 64000 | #12 | D:¥picture |
| ... | | | | | |

| FILE NAME | TITLE | PIXEL NUMBER | COLOR NUMBER | KEYWORD ID | STORAGE LOCATION |
|---|---|---|---|---|---|
| pisa. bmp | LEANING TOWER IN PISA | 20 × 800 | 64000 | #9 | ¥tower |
| rocky. gif | ROCKY MOUNTAINS | 1024 × 768 | 64000 | #4 | ¥mountain |
| ... | | | | | |

71

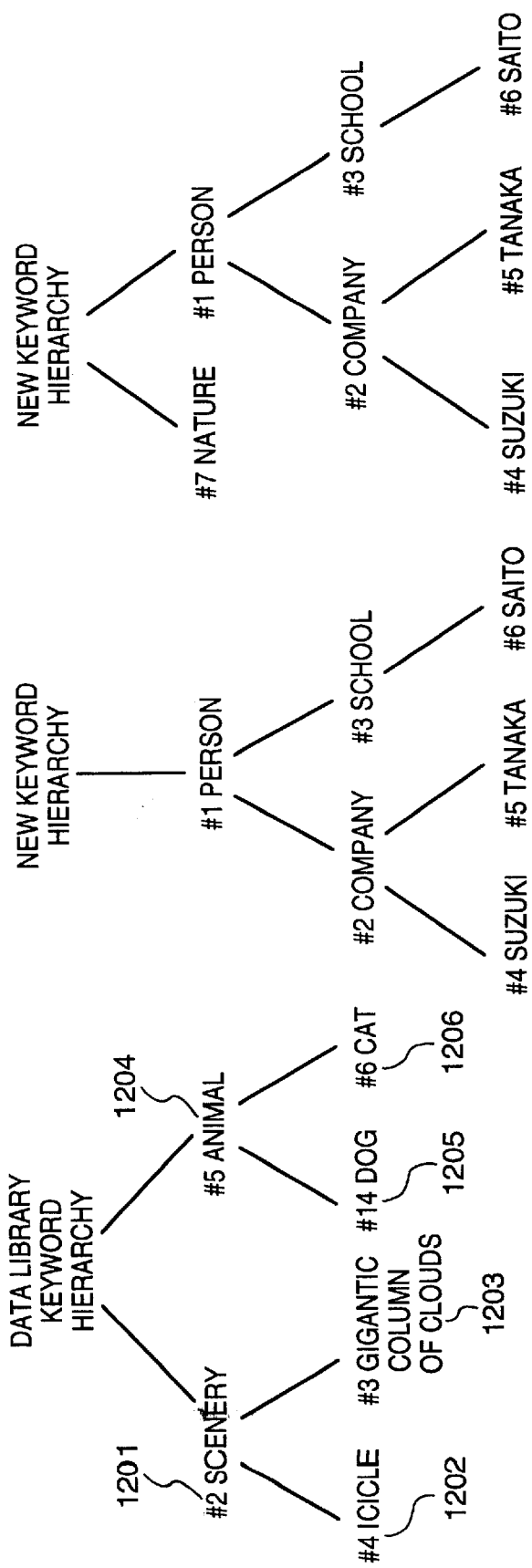

DATA MANAGEMENT SYSTEM FOR RETRIEVING DATA BASED ON HIERARCHIZED KEYWORDS ASSOCIATED WITH KEYWORD NAMES

BACKGROUND OF THE INVENTION

The present invention relates to a data management method and a data management system and, more particularly, to a data management method and a data management system using hierarchical keywords. The present invention also relates to a recording medium such as a floppy disk for storing data or programs which realize this data management method.

Conventionally, to provide an efficient data manipulation work environment in data management systems such as databases, a method has been proposed in which a keyword which distinctively represents the contents of data, such as document data, image data, or voice data, is added to the data and the user retrieves the data by using the keyword.

For example, a keyword "Kawasaki City" is added to an image taken in Kawasaki City and a keyword "Yokohama City" is added to an image taken in Yokohama City, and the correspondence (attribute information) between the keywords "Kawasaki City" and "Yokohama City" and the image data to which these keywords are added is held. This enables retrieval of images based on the locations where these images were taken. Furthermore, when the name of a theme or the like information is added as a keyword to document data, documents relating to a certain theme can be retrieved.

Another method has been proposed which allows a system to perform flexible retrieval by giving the system a hierarchy of keywords. As an example, assume a data management system has a keyword hierarchy as shown in FIG. 32. The use of this keyword hierarchy allows a user to retrieve the image given the keyword "Kawasaki City" or "Yokohama City" described above by using a keyword "Kanagawa Prefecture", which is not explicitly given. This is an effective retrieval method when the user cannot remember which of Kawasaki City or Yokohama City is the location where a desired image was taken.

Unfortunately, when the hierarchical keywords, the attribute information, and the data managed by these keywords and information are distributed or onerously supplied in the form of a removal medium (e.g., a floppy disk or a CD-ROM), a means for merging them in the hierarchical keywords and the attribute information of the system main body is not provided. Consequently, to retrieve data in the medium the user must connect the medium to the main body and selectively use them or manually perform the merging operation.

In conventional data management systems using keywords, to add a plurality of keywords to one data it is necessary to add the keywords one by one to the data. Accordingly, even if there is a group of keywords which have a close relationship to each other and hence are not separately added in most cases, these keywords must be added one by one to data. This results in a cumbersome and inconvenient operation.

SUMMARY OF THE INVENTION

It is an object of the present invention to provide a data management method and a data management system capable of automatically merging hierarchical keywords and attribute information in other hierarchical keywords and attribute information.

It is another object of the present invention to provide a data management method and a data management system capable of reducing the work of adding keywords to data.

To achieve the above objects, a data management method of the present invention is a data management method of managing data on the basis of a plurality of keywords hierarchized in accordance with classes of objects to be managed, comprising the steps of extracting, when first and second hierarchized keyword groups are given, keywords having the same keyword name or keywords equal in keyword names of all parents from the first and second keyword groups, performing a logical operation for the extracted keywords, by using the keyword names, between a set of keywords immediately below a parent keyword in the first keyword group and a set of keywords immediately below a parent keyword in the second keyword group, and forming one hierarchized keyword group consisting of the keywords of the first keyword group and the keywords of the second keyword group on the basis of the logical operation.

The method further comprises the step of specifying a keyword in the first or second keyword groups, wherein the logical operation is performed for keywords in lower levels than the specified keyword and for a group of keywords not containing the specified keyword, and in the formation of the keyword group unique numbers are assigned as keyword IDs even to keywords which are not objects of the logical operation. The logical operation includes OR and AND. The method comprises a first data group corresponding to the first keyword group and a second data group corresponding to the second keyword group, and further comprises the step of retrieving data corresponding to keywords from a set consisting of the first and second data groups on the basis of the hierarchized keyword group formed. The method further comprises the steps of forming a keyword group consisting of a plurality of keywords, and adding a plurality of keywords in the keyword group to data and storing the data, when the keyword group is designated.

Another data management method of the present invention is a data management method of managing data on the basis of a plurality of keywords hierarchized in accordance with classes of objects to be managed, comprising the steps of forming a keyword group consisting of a plurality of keywords, and adding a plurality of keywords in the keyword group to data and storing the data, when the keyword group is designated. When retrieval using a predetermined keyword is designated, data of one of the keywords, which is added to the stored data and agrees with the predetermined keyword, is retrieved.

A data management system of the present invention is a data management system for managing data on the basis of a plurality of keywords hierarchized in accordance with classes of objects to be managed, comprising keyword extracting means for extracting, when first and second hierarchized keyword groups are given, keywords having the same keyword name or keywords equal in keyword names of all parents from the first and second keyword groups, and keyword group forming means for performing a logical operation for the extracted keywords, by using the keyword names, between a set of keywords immediately below a parent keyword in the first keyword group and a set of keywords immediately below a parent keyword in the second keyword group, and forming one hierarchized keyword group consisting of the keywords of the first keyword group and the keywords of the second keyword group.

The system further comprises keyword specifying means for specifying a keyword in the first or second keyword groups, wherein the keyword specifying means performs the logical operation for keywords in lower levels than the specified keyword and for a group of keywords not containing the specified keyword, and assigns unique numbers as keyword IDs even to keywords which are not objects of the logical operation. The logical operation includes OR and AND. The system further comprises first data storage means for storing a first data group corresponding to the first keyword group, second data storage means for storing a second data group corresponding to the second keyword group, and data retrieving means for retrieving data corresponding to keywords from a set consisting of the first and second data groups on the basis of the hierarchized keyword group formed. The system further comprises keyword group forming means for forming a keyword group consisting of a plurality of keywords, and data storage means for adding a plurality of keywords in the keyword group to data and storing the data, when the keyword group is designated.

Another data management system of the present invention is a data management system for managing data on the basis of a plurality of keywords hierarchized in accordance with classes of objects to be managed, comprising keyword group forming means for forming a keyword group consisting of a plurality of keywords, and data storage means for adding a plurality of keywords in the keyword group to data and storing the data, when the keyword group is designated. The system further comprises data retrieving means for retrieving, when retrieval using a predetermined keyword is designated, data of one of the keywords, which is added to the stored data and agrees with the predetermined keyword.

Still another data management system of the present invention is a data management system for managing data on the basis of a plurality of keywords hierarchized in accordance with classes of objects to be managed, comprising first and second keyword storage means for holding a plurality of keyword groups hierarchized in accordance with classes of objects to be managed, keyword extracting means for extracting keywords having the same keyword name or keywords equal in keyword names of all parents from the first and second keyword storage means, keyword logical operation means for performing a logical operation for the extracted keywords, by using the keyword names, between a set of keywords immediately below the parent keyword in the first keyword storage means and a set of keywords immediately below the parent keyword in the second keyword storage means, and keyword group forming means for forming one keyword group consisting of all or some of the keywords in the first keyword storage means and all or some of the keywords in the second keyword storage means on the basis of the logical operation performed by the keyword logical operation means, and storing the formed keyword group in third keyword storage means.

The system further comprises keyword specifying means for specifying a keyword in the first or second keyword group, wherein the keyword logical operation means performs the logical operation for keywords in lower levels than the specified keyword and for a group of keywords not containing the specified keyword, and the keyword group forming means assigns unique numbers as keyword IDs even to keywords which are not objects of the logical operation. The logical operation includes OR and AND.

Still another data management system of the present invention comprises first and second data storages for storing data, first and second keyword storages for hierarchizing and holding keywords in accordance with classes of objects to be managed by using keyword names, as names of data, and keyword IDs, as uniquely assigned numbers, a first attribute storage for holding correspondence between the data in the first data storage and the keywords in the first keyword storage and holding storage locations of the data in the first data storage, a second attribute storage for holding correspondence between the data in the second data storage and the keywords in the second keyword storage and holding storage locations of the data in the second data storage, keyword logical operation means for performing a logical operation for keywords having the same keyword name or keywords equal in keyword names of all parents in the first and second keyword storages, by using the keyword names, between a set of keywords immediately below the parent keyword in the first keyword storage and a set of keywords immediately below the parent keyword in the second keyword storage, keyword forming means for assigning unique numbers as keyword IDs to the keywords which are the results of the logical operation performed by using the keyword names, and forming one keyword hierarchy consisting of the keywords in the first keyword storage and the keywords in the second keyword storage, and attribute forming means for forming correspondence between the data in the first data storage and the keywords in the keyword hierarchy formed by the keyword forming means, which is based on the correspondence between the data in the first data storage and the keywords in the first keyword storage held by the first attribute storage and on the keyword IDs assigned in the formation of the keyword hierarchy, and storage locations of the data in the first storage, which are uniquely determined in the overall system, and forming correspondence between the data in the second data storage and the keywords in the keyword hierarchy formed by the keyword forming means, which is based on the correspondence between the data in the second data storage and the keywords in the second keyword storage held by the second attribute storage and on the keyword IDs assigned in the formation of the keyword hierarchy, and storage locations of the data in the second storage, which are uniquely determined in the overall system.

The system further comprises keyword specifying means for specifying a keyword in the first or second keyword group, wherein the keyword logical operation means performs the logical operation for keywords in lower levels than the specified keyword and for a group of keywords not containing the specified keyword, and the keyword forming means assigns unique numbers as keyword IDs even to keywords which are not objects of the logical operation. The logical operation includes OR and AND.

Still another data management system of the present invention comprises a data storage for storing data, a keyword storage for holding a plurality of keywords hierarchized in accordance with classes of objects to be managed, an attribute storage for holding correspondence between the data in the data storage and the keywords in the keyword storage, a keyword group storage for holding a plurality of keyword groups each consisting of a plurality of keywords in the keyword storage, an d an attribute manager for writing, when adding a keyword group in the keyword group storage to data in the data storage, correspondence between all keywords constituting the keyword group and the data into the attribute storage.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a view showing an example of a user attribute storage;

FIG. 5 is a view showing an example of a data library attribute storage;

FIG. 18 is a view showing an example of a data library keyword hierarchy;

FIG. 19 is a view showing an intermediate state of the formation of a new keyword hierarchy;

FIG. 20 is a view showing an intermediate state of the formation of a new keyword hierarchy;

DETAILED DESCRIPTION OF THE PREFERRED EMBODIMENT

Example 1 of Configuration of Data Management System

Figure 1:
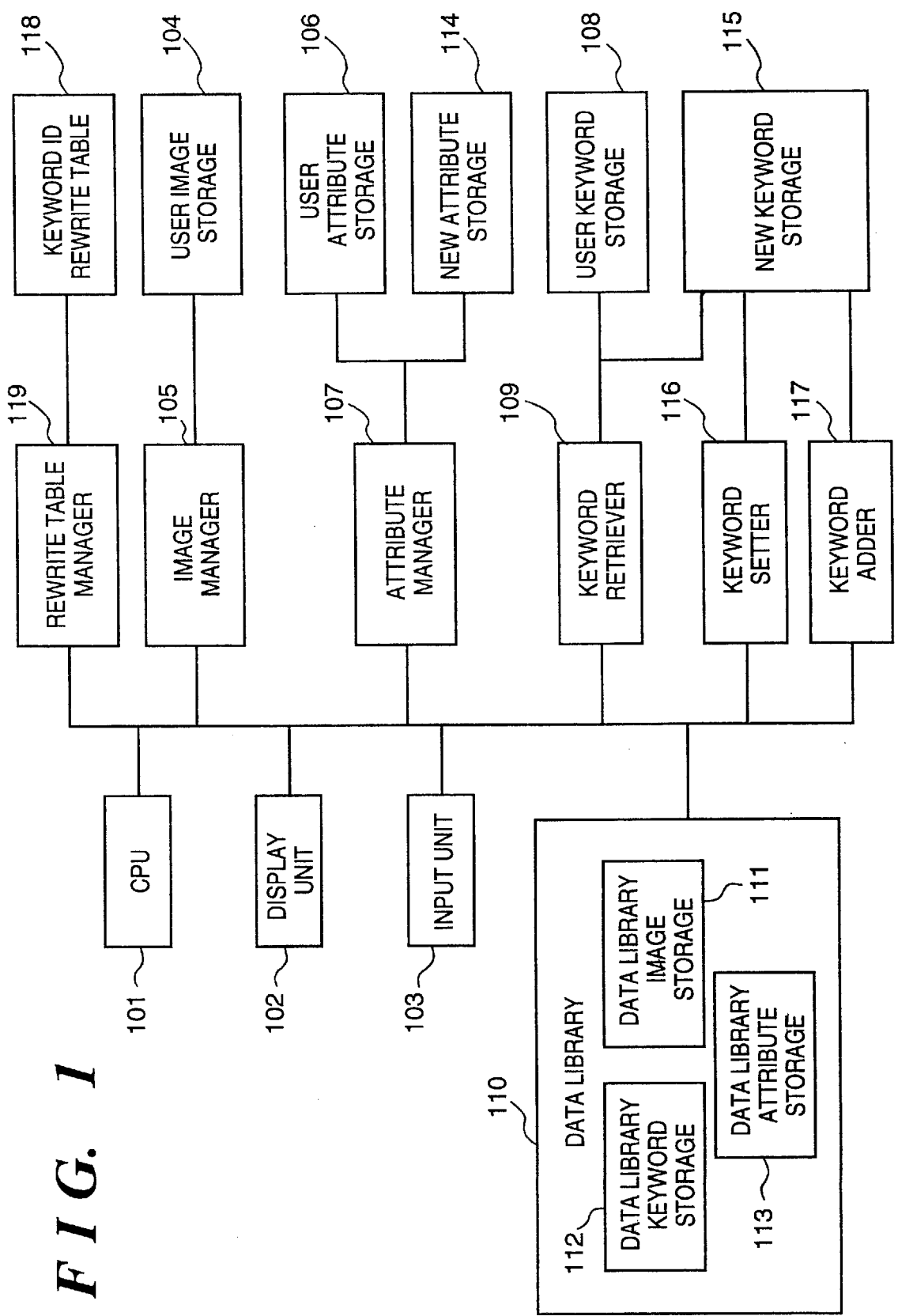
FIG. 1 is a block diagram showing an example of the configuration of a data management system according to an embodiment.

FIG. 1 is a block diagram showing an example of the configuration of a data management system according to this embodiment.

In FIG. 1, reference numeral 101 denotes a CPU for controlling the overall system; 102, a display unit for displaying various information to the user; and 103, an input unit by which the user inputs instructions and the like.

A user image storage 104 stores image data as an example of an object to be managed. A user attribute storage 106 stores attributes pertaining to each image stored in the user image storage 104. For example, the user attribute storage 106 has the configuration shown in FIG. 2. Referring to FIG. 2, file name 30, title 31, pixel number 32, color number 33, keyword ID 34, and storage location 36 are provided as the attributes of image data. These attributes are made correspond to each image in the user image storage 104. In FIG. 2, the keyword ID 34 is a number uniquely representing a keyword used to retrieve an image. The keyword ID 34 is defined in a user keyword storage 108 (to be described later). The storage location 36 indicates a location where actual image data is stored. This location is represented by the drive name and the directory name. A new attribute storage 114 stores attributes formed by an operation to be described later.

Figure 3:
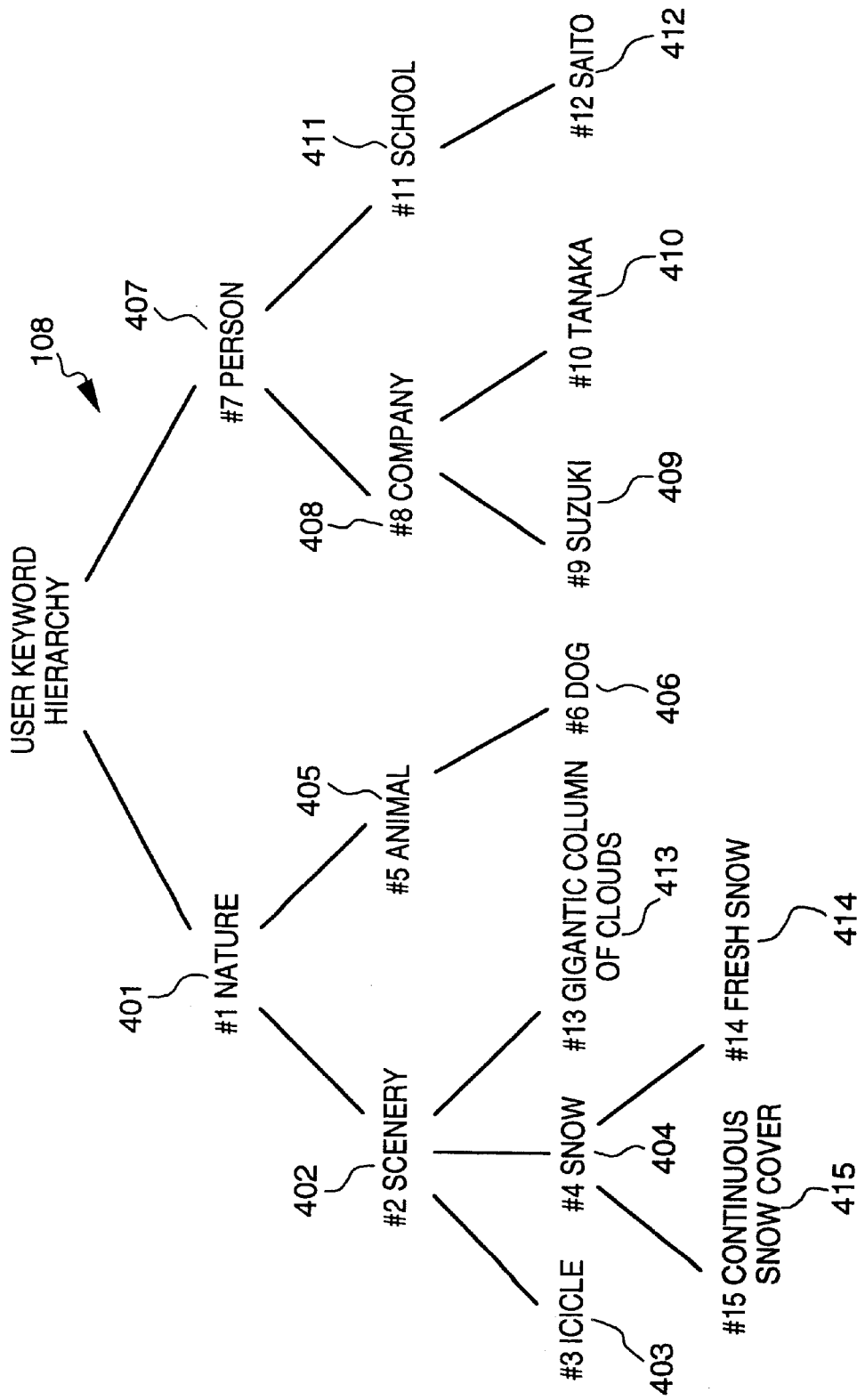
FIG. 3 is a view showing an example of a user keyword hierarchy.

The user keyword storage 108 stores keywords added to the images in the user image storage 104 in order to facilitate image retrieval. For example, the user keyword storage 108 has the configuration as shown in FIG. 3. In FIG. 3, each of keywords 401 to 405 consists of a keyword ID (a number on the left side) and a keyword name (a character string on the right side). As an example, the keyword ID of the keyword 401 is "1" and its keyword name is "nature". The keyword ID is a specific number which each keyword has, and the keyword name is a character string representing the name of the keyword. Keywords are hierarchized in accordance with the classes or ranks of objects to be managed, and in this way the keywords are arranged. To facilitate image retrieval, these keywords can be added to the image data in the user image storage 104. The correspondence between the images and the keywords added to the images is stored in the user attribute storage 106. The user keyword storage 108 will be sometimes referred to as a user keyword hierarchy hereinafter because this storage is primarily created by the user. A new keyword storage 115 stores keywords formed by an operation to be described later.

A keyword retriever 109 retrieves a keyword of interest from the user keyword storage 108 or the new keyword storage 115 as will be described later. A keyword setter 116 sets a target keyword (to be described later). A keyword adder 117 adds keywords to the new keyword storage 115.

Figure 4:
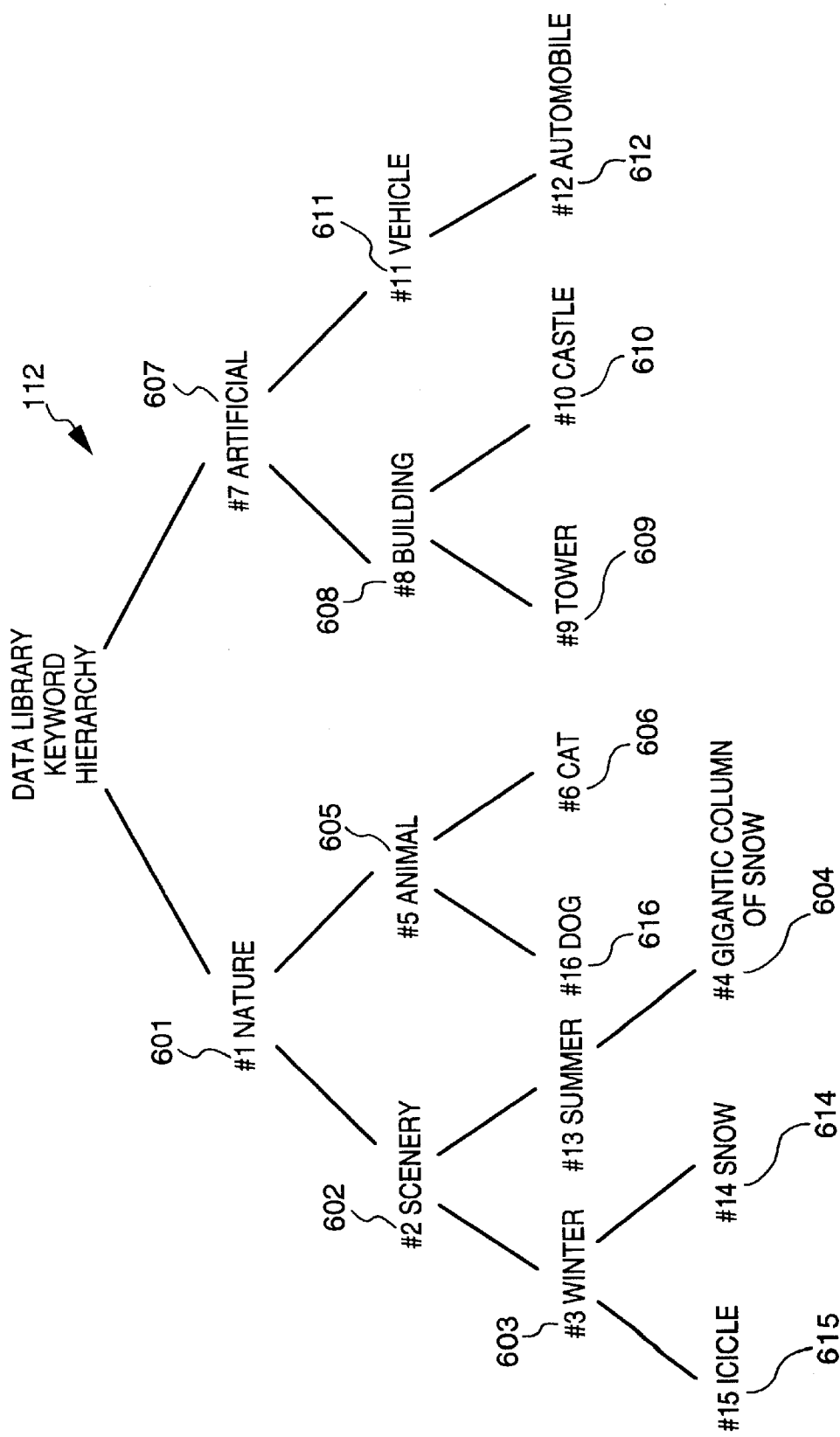
FIG. 4 is a view showing an example of a data library keyword hierarchy.

A data library 110 is constituted by a medium, such as a floppy disk or a CD-ROM, which is detachable from the system. The data library 110 contains a data library image storage 111, a data library keyword storage 112, and a data library attribute storage 113 having the same respective functions as described above. FIG. 4 illustrates an example of the data library keyword storage 112, and FIG. 5 illustrates an example of the data library attribute storage 113. The keywords in the data library keyword storage 112 are added to the data library image storage 111. The data library attribute storage 113 holds attributes concerning the images in the data library image storage 111. The keyword hierarchy in the data library keyword storage 112 will be occasionally referred to as a data library keyword hierarchy hereinafter.

An image manager 105 manages the user image storage 104 or the data library image storage 111 to store, delete, or display images. An attribute manager 107 manages the user attribute storage 106 or the data library attribute storage 113 to store, delete, or refer to attributes.

A keyword ID rewrite table 118 holds the correspondence between the keywords in the data library keyword storage 112 and the keywords in the new keyword storage 115 and the correspondence between the keywords in the user keyword storage 108 and the keywords in the new keyword storage 115. A rewrite table manager 119 performs registration and reference to the keyword ID rewrite table 118.

The user image storage 104, the user attribute storage 106, the new attribute storage 114, the user keyword storage 108, the new keyword storage 115, and the keyword ID rewrite table 118 exist as data in a rewritable RAM (not shown). The image manager 105, the attribute manager 107, the keyword retriever 109, the keyword setter 116, the keyword adder 117, and the rewrite table manager 119 exist as programs indicating procedures done by the CPU 101 in a ROM or RAM (not shown). Note that all or some of the above data and programs can be loaded from an external storage medium such as a floppy disk into a RAM (not shown) or can be down-loaded from a host through a communication line.

Example 1 of Operation of Data Management System

The operation of the data management system of this embodiment will be described below.
(Data retrieval from image storage)

Figure 6:
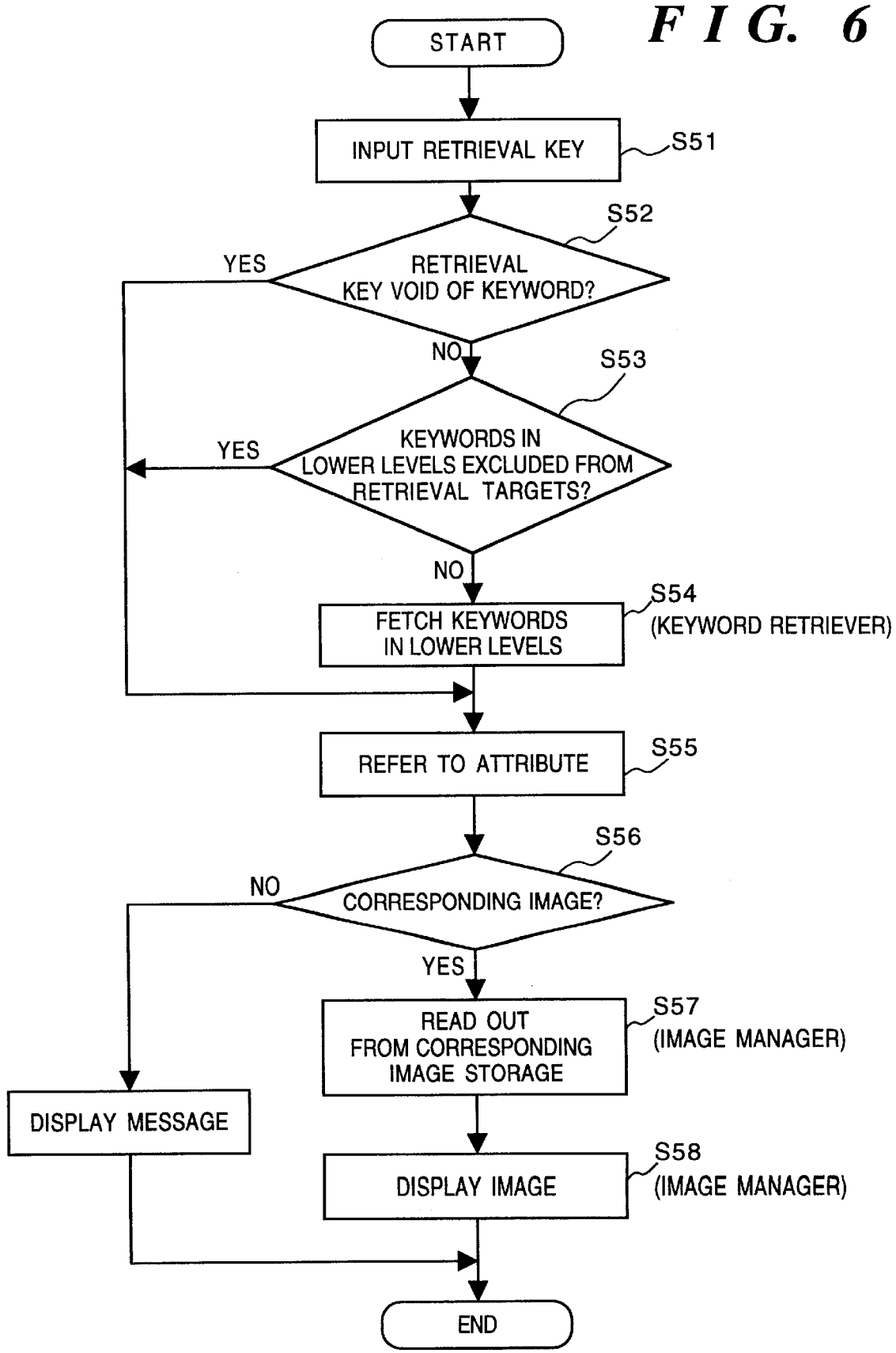
FIG. 6 is a flow chart showing a procedure of data retrieval.

Usually, the user retrieves the data in the user image storage 104 in the system by using the information in the user keyword storage 108 and the user attribute storage 106. FIG. 6 is a flow chart showing the procedure of this processing.

In step S51, the user specifies an attribute (or attributes) in the user attribute storage 106 as a key for retrieving an image. In step S52, whether the attribute input in step S51 is void of a keyword is checked. If the attribute is void of any keyword, the flow advances to step S55. If the attribute is not void of a keyword, it is checked in step S53 whether images added with keywords in lower levels than the level of the contained keyword in the keyword hierarchy are to be excluded from targets of retrieval. If YES in step S53, the flow advances to step S55.

In step S55, the attribute manager 107 refers to the user attribute storage 106 to search for an image corresponding to the key specified in step S51. In step S56, whether the corresponding image is present is checked. If the corresponding image is present, the flow advances to step S57, and the image manager 105 refers to the storage location 36 described in the user attribute storage 106 and fetches the corresponding image from the user image storage 104. After the image is fetched, the flow advances to step S58, and the fetched image is displayed on the display unit 102. If there is no corresponding image in step S56, the flow advances to step S59, and the attribute manager 107 displays this information on the display unit 102 to inform the user that no corresponding image is found.

If it is determined in step S53 that images added with keywords in lower levels than the level of the keyword of interest in the keyword hierarchy in the user keyword storage 108 are not to be excluded from targets of retrieval, the flow advances to step S54. In step S54, the keyword retriever 109 fetches keywords in lower levels than the keyword specified in step S51 and transfers the fetched keywords to the attribute manager 107. The flow advances to step S55, and images are searched by using these keywords as retrieval keywords. In accordance with this operation, when a keyword 408, #8 "company", shown in FIG. 3 is designated, for example, it is possible to retrieve and display an image added with a keyword 409, #9 "Suzuki", and an image added with a keyword 410, #10 "Tanaka".

The user also can retrieve the data in the data library image storage 111 in the data library by using the information in the data library keyword storage 112 and the data library attribute storage 113. This operation is similar to the operation described above. The only difference is that the data library image storage 111, the data library attribute storage 113, and the data library keyword storage 112 existing in the data library 110 are used.
(Merging of keywords)

Furthermore, the user can form the new keyword storage 115 by merging the user keyword storage 108 and the data library keyword storage 112 and form the new attribute storage 114 by merging the user attribute storage 106 and the data library attribute storage 113, and, by using these formed storages, can retrieve the data in the user image storage unit 104 in the system and the data in the data library image storage 111 in the data library. This operation will be described next.

Figure 7:
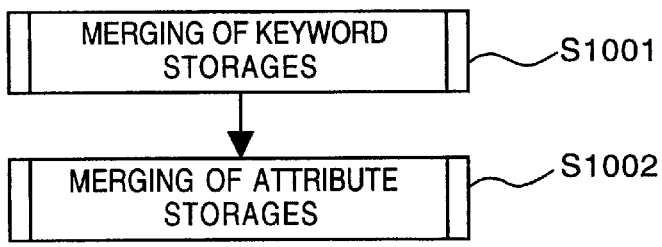
FIG. 7 is a flow chart showing a procedure of merging the data library in the system.

First, the user requests the system to perform merging from the input unit 103. Consequently, as illustrated in FIG. 7, the system first performs merging of the keyword storages in step S1001 and then performs merging of the attribute storages in step S1002. Details of this processing will be described below.
(Example 1 of merging of keyword storages)

Merging of the keyword storages will be described below with reference to the flow chart in FIG. 8 by taking merging of a data library keyword hierarchy in FIG. 10 and a user keyword hierarchy in FIG. 9 as an example. The result is illustrated in FIG. 11.

In step S1401, the keyword setter 116 sets the root of the new keyword storage 115 as a target keyword. The target keyword indicates a keyword immediately below which keywords are added during the course of formation of a keyword hierarchy in the new keyword storage 115. Since no keyword exists in the new keyword storage 115 in an initial state, the root is set as the target keyword. In the subsequent steps, an operation of adding keywords to immediately below the target keyword is performed.

In step S1402, the keyword adder 117 fetches keywords immediately below a keyword (if any) corresponding to the target keyword set in step S1401 or S1405 in the user keyword hierarchy and also fetches keywords immediately below a keyword (if any) corresponding to the target keyword in the data library keyword hierarchy.

A keyword corresponding to the target keyword has the same keyword name as the target keyword, and the keyword names of all parents (including a parent of a parent) of this keyword are equal to the keyword names of all parents of the target keyword. In the case of the previous example, if the target keyword is the root, a keyword corresponding to the target keyword in the user keyword hierarchy is the root, and a keyword "nature" 2201 and a keyword "person" 2207 immediately below the root are fetched. On the other hand, a keyword corresponding to the target keyword in the data library keyword hierarchy is the root, and a keyword "nature" 2301 and a keyword "artificial" 2307 immediately below the root are fetched.

In step S1403, the keyword adder 117 ORs the two sets of keywords fetched in step S1402 by using the keyword names as determination criteria, assigns keyword IDs to the results, and writes the results immediately below the target keyword. In the previous example, ORing the set of the keyword "nature" 2201 and the keyword "person" 2207 and the set of the keyword "nature" 2301 and the keyword "artificial" 2307 by using the keyword names as criteria yields keywords having keyword names "nature", "person", and "art".

Figure 12:
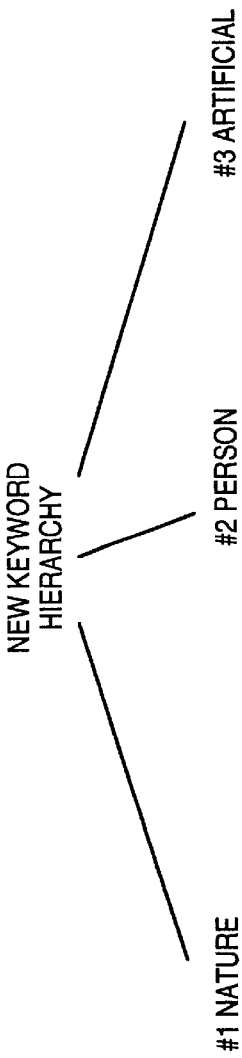
FIG. 12 is a view showing an intermediate state of the formation of the new keyword hierarchy in FIG. 11.

Keyword IDs are assigned in sequence from "#1" to these keywords, and the keywords are written immediately below the target keyword in the new keyword storage 115. The result is shown in FIG. 12. In this manner, the user keyword hierarchy in FIG. 9 and the keywords in the first level of the data library keyword hierarchy in FIG. 10 are merged.

In step S1404, the rewrite table manager 119 writes, in the keyword ID rewrite table 118, the correspondence between the keyword IDs assigned to the keywords written immediately below the target keyword in step S1402 and the keyword IDs of the keywords in the user keyword hierarchy and the data library keyword hierarchy. In the previous example the results are as denoted by reference numerals 1601 to 1603 in FIG. 13. 1601, 1602, and 1603 indicate that keyword ID #1 in the data library keyword hierarchy and keyword ID #1 in the user keyword hierarchy are rewritten by keyword #1 in the new keyword storage, that keyword ID #7 in the user keyword hierarchy is rewritten by keyword #2 in the new keyword storage, and that keyword ID #7 in the data library keyword hierarchy is rewritten by keyword ID #3 in the new keyword storage, respectively.

Figures 13, 14:
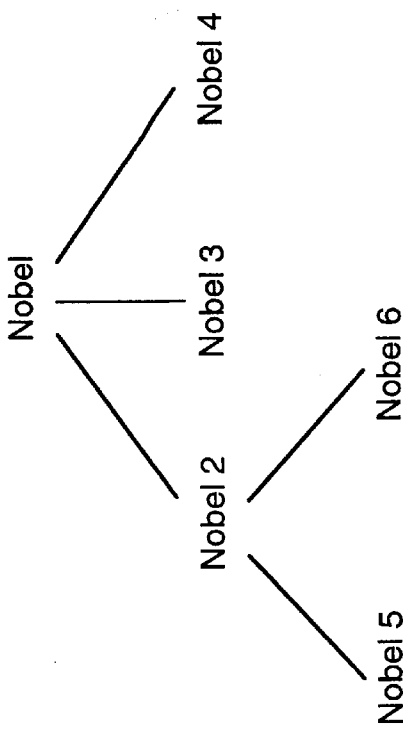
FIG. 13 is a view showing the contents of a keyword ID rewrite table.
FIG. 14 is a view showing an example of a tree structure.

In step S1405, the keyword setter 116 selects one keyword from the new keyword storage 115 in accordance with a certain criterion. By using this keyword as the target keyword, it is checked in step S1406 whether all keywords have been selected as the target keyword. If NO in step S1406, the flow returns to step S1402. If all keywords have been selected as the target keyword, the operation is completed subsequently to step S1406. Although various criteria can be used as a "certain criterion", in this embodiment depth priority is taken as an example. On the basis of the depth priority, in the case of a tree structure shown in FIG. 14, for example, Node1, Node2, Node5, Node6, Node3, and Node4 are selected in this order. The determination in step S1406 is performed by checking whether new keyword IDs are assigned to all keywords in the keyword ID rewrite table 118 (FIG. 13).

Figure 9:
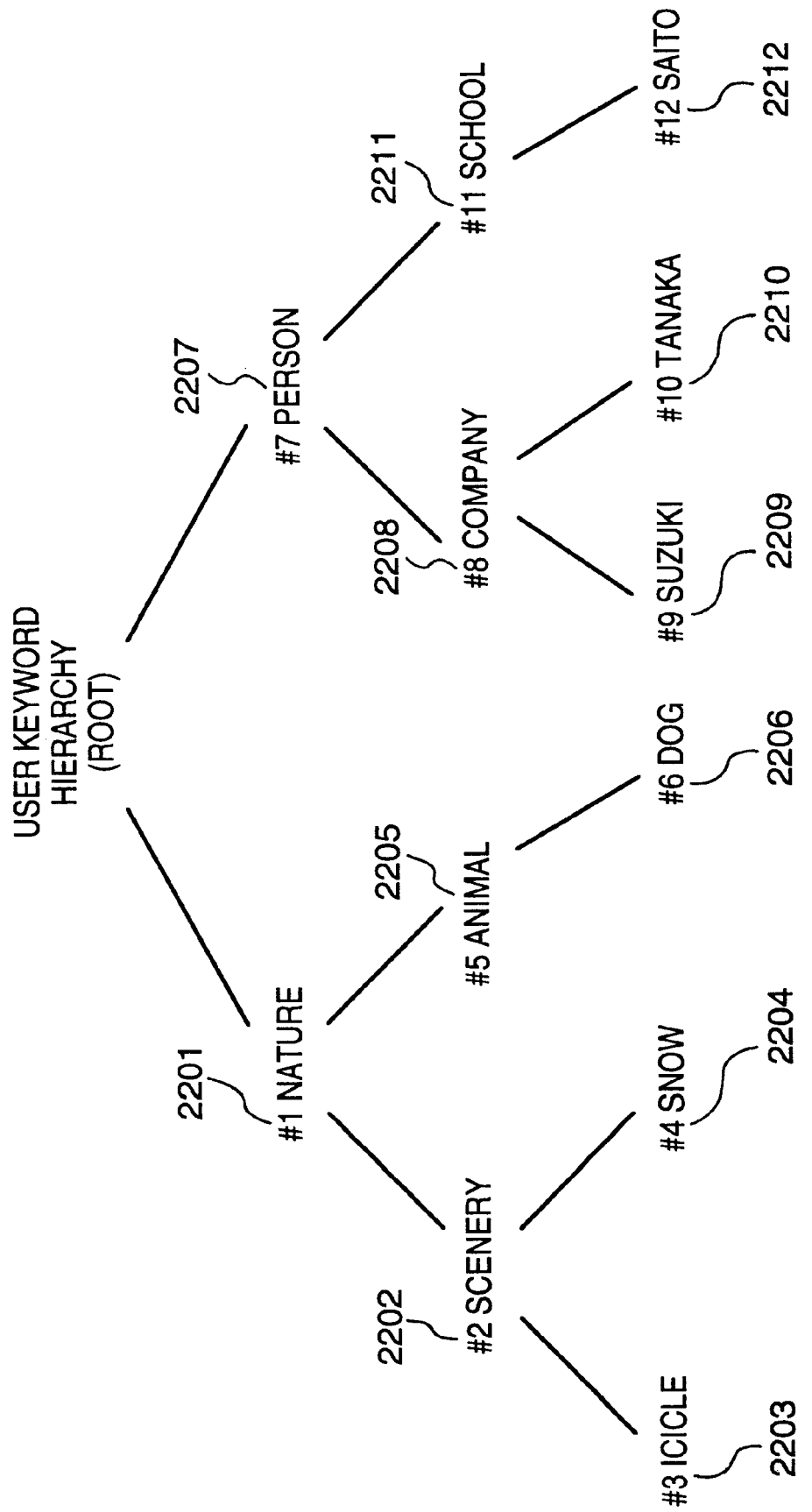
FIG. 9 is a view showing an example of a user keyword hierarchy.
Figure 10:
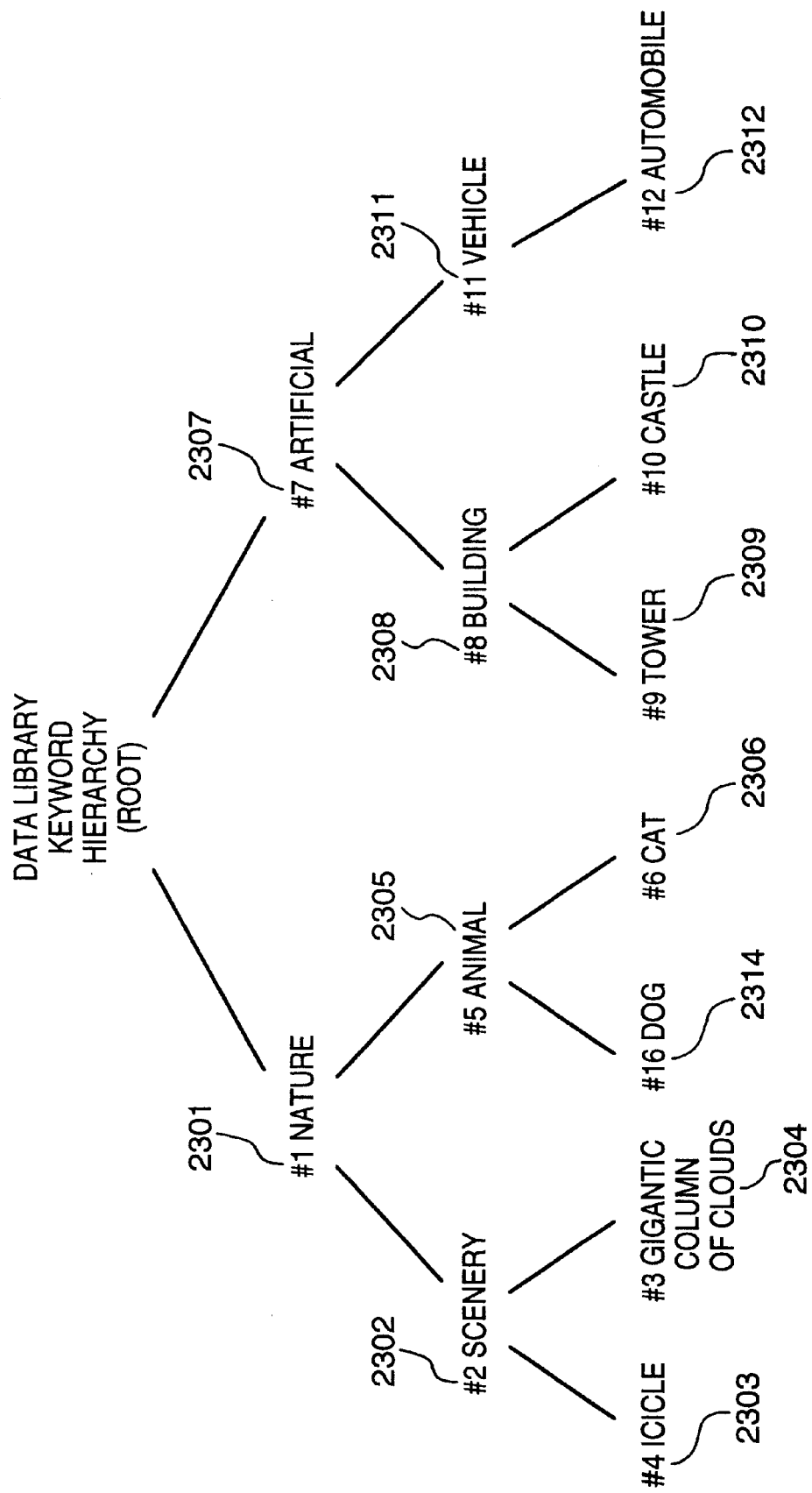
FIG. 10 is a view showing an example of a data library keyword hierarchy.
Figure 11:
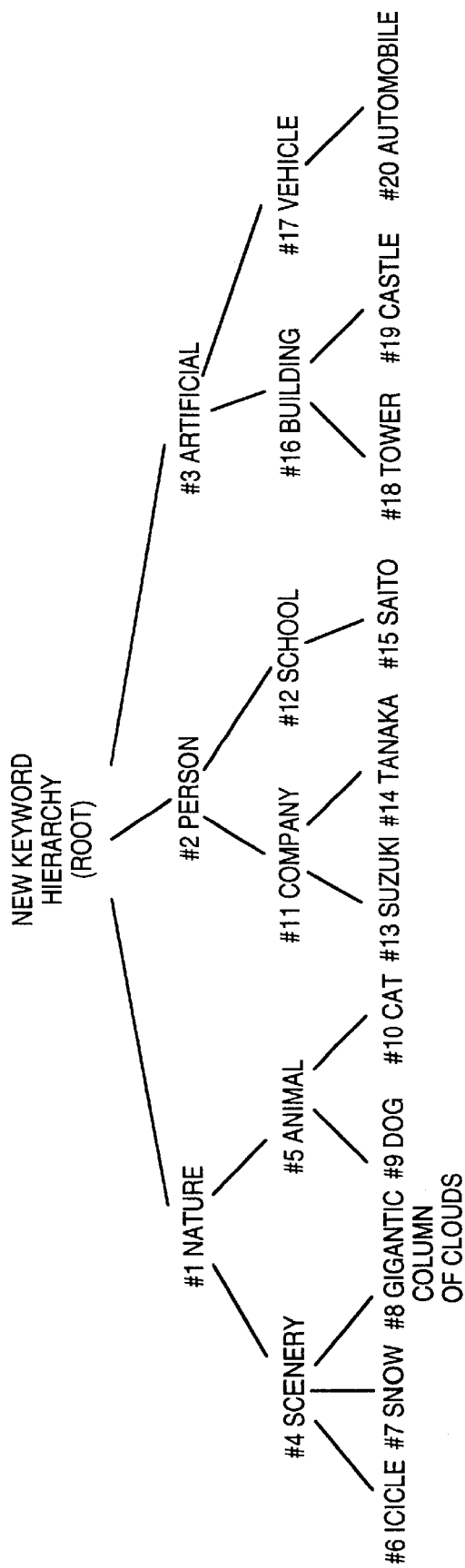
FIG. 11 is a view showing the result of merging of the data library keyword hierarchy in FIG. 10 and the user keyword hierarchy in FIG. 9 performed by the procedure in FIG. 8.

FIG. 11 shows the result of merging of the user keyword hierarchy in FIG. 9 and the data library keyword hierarchy in FIG. 10.

(Example of merging of attribute storages)

Figure 15:
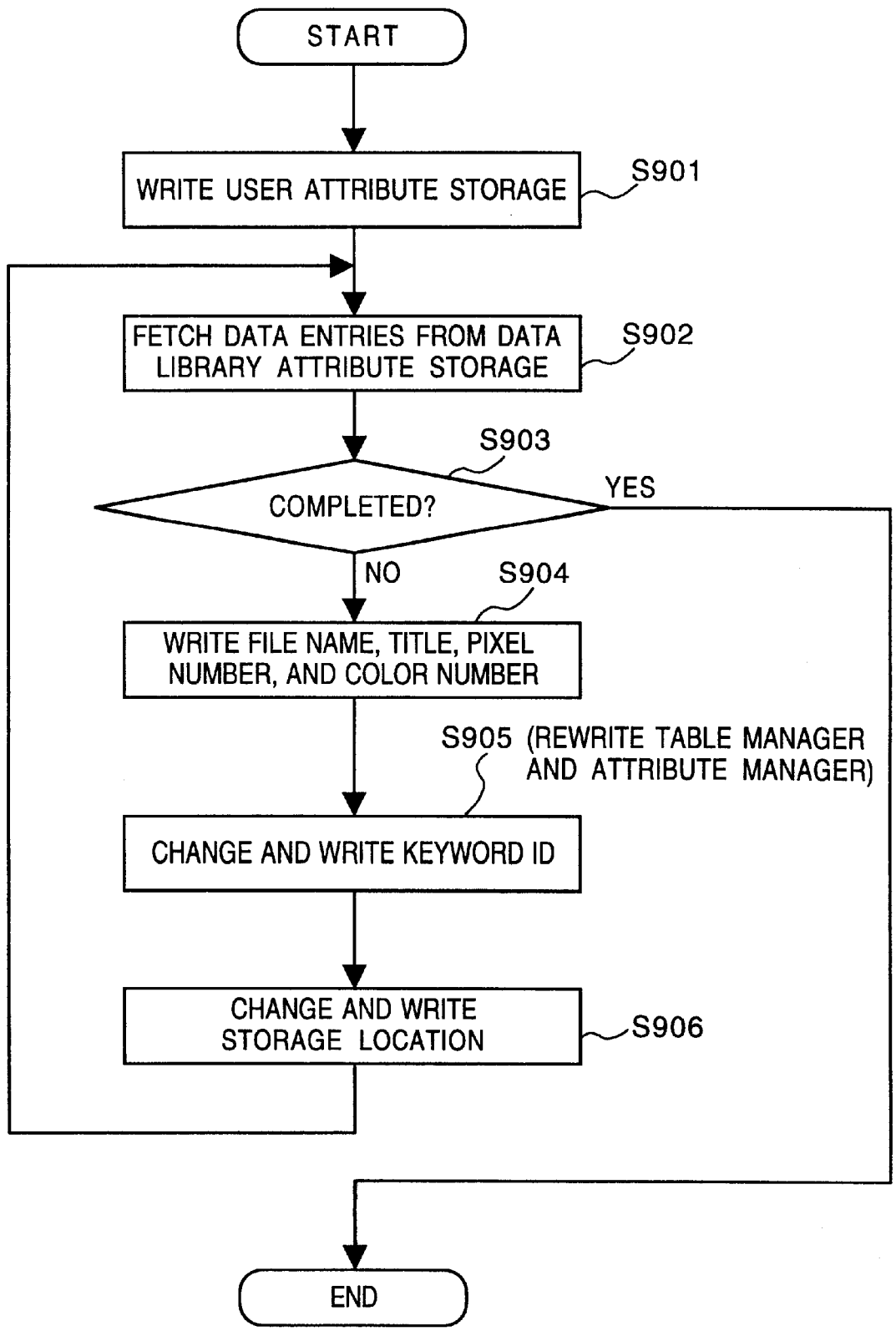
FIG. 15 is a flow chart showing a procedure of merging of attribute storages in this embodiment.

An operation of forming the new attribute storage 114 by merging the user attribute storage 106 and the data library attribute storage 113 will be described below. FIG. 15 shows a flow chart of this operation, and the operation will be described with reference to FIG. 15. Assume the contents of the data library attribute storage 113 in FIG. 5 and the user attribute storage 106 in FIG. 2 are merged.

Figure 16:
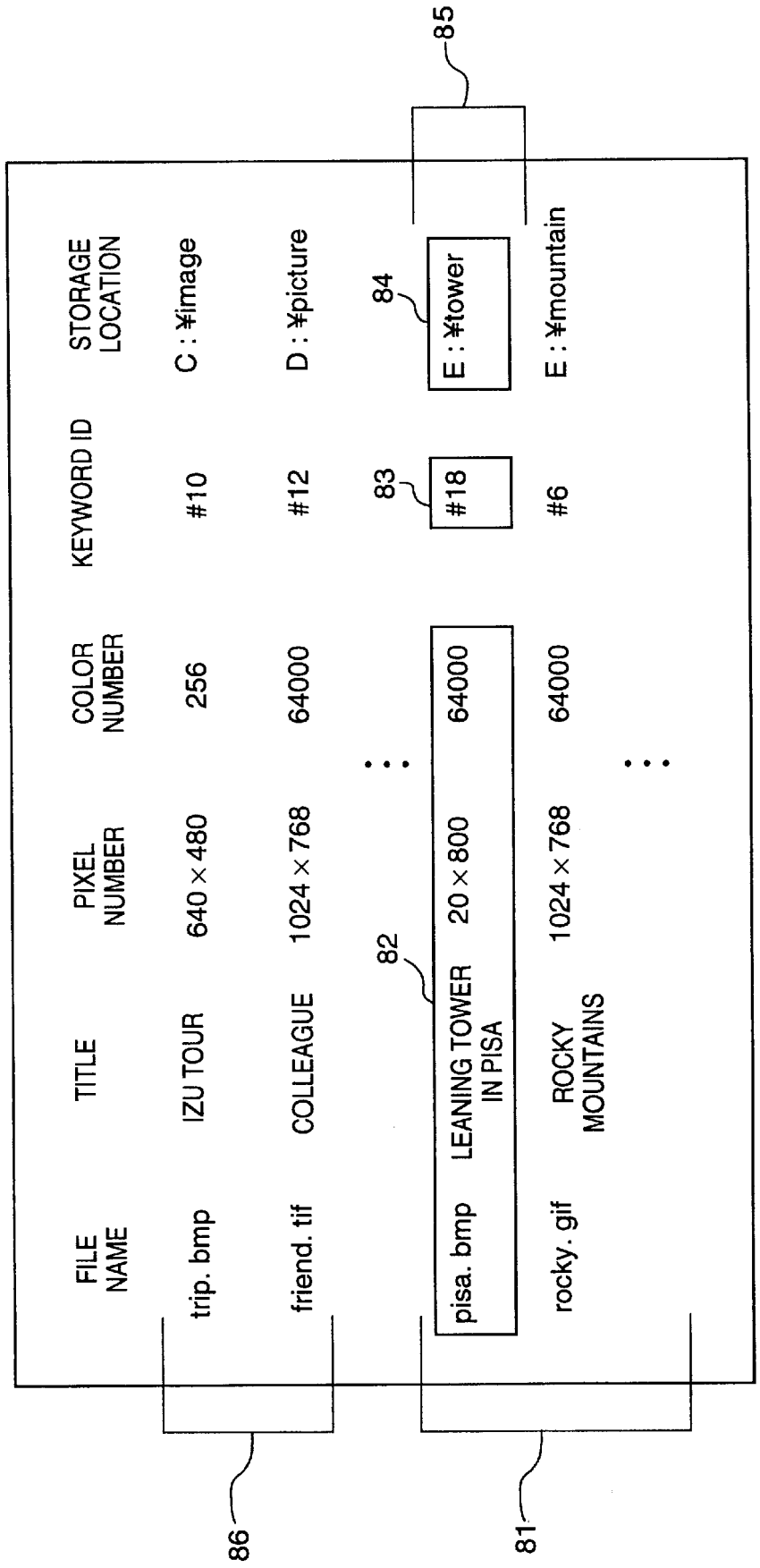
FIG. 16 is a view showing the result of merging of the data library attribute storage in FIG. 5 and the user attribute storage in FIG. 2 performed by the procedure in FIG. 15.

In step S901, all of the contents of the user attribute storage 106 are written into the new attribute storage 114. In the example described previously, contents denoted by reference numeral 86 in FIG. 16 are written. In the subsequent steps, the contents of the data library attribute storage 113 are written into the new attribute storage 114.

In step S902, one data entry is fetched from the data library attribute storage 113. In the previous example, a data entry 71 in FIG. 5 is fetched. If all data entries have been already fetched, the flow branches from step S903 to complete the processing. If a data entry is fetched, the flow advances to step S904, and the file name, title, pixel number, and color number of the fetched data entry are written into the new attribute storage 114. In the case of the data entry 71 in FIG. 5, contents denoted by reference numeral 82 in FIG. 16 are written.

In step S905, in accordance with the contents of the keyword ID rewrite table 118 formed when the new keyword storage 115 is formed, the keyword ID in the data library attribute storage 113 is rewritten and written into the new attribute storage 114. In the data entry 71 case, a keyword ID 83, FIG. 16, is written if the keyword ID rewrite table 118, FIG. 13, is used.

In step S906, the data storage location described in the data library attribute storage 113 is so changed as to indicate a storage location in the overall system and written into the new attribute storage 114. In the data entry 71 case, since the name of a drive to which the data library 110 is detachably loaded is "E", "¥tower" is changed to "E:¥tower" and written as indicated by reference numeral 84 in FIG. 16.

After step S906, the flow returns to step S902, the next data entry is fetched from the data library attribute storage 113, and the manipulation from step S904 to step S906 is similarly performed.

FIG. 16 shows the contents of the new attribute storage formed by merging the contents of the data library attribute storage 113, FIG. 5, and the user attribute storage 106, FIG. 2.

When the user wishes to retrieve data from the data library image storage 111 and the user image storage 104, this retrieval is done in accordance with the flow chart shown in FIG. 6 by using the new keyword storage 115 and the new attribute storage 114 formed by the above operation.

(Example 2 of merging of keyword storages)

Another example of the procedure of merging the keyword storages will be described below.

Figure 17:
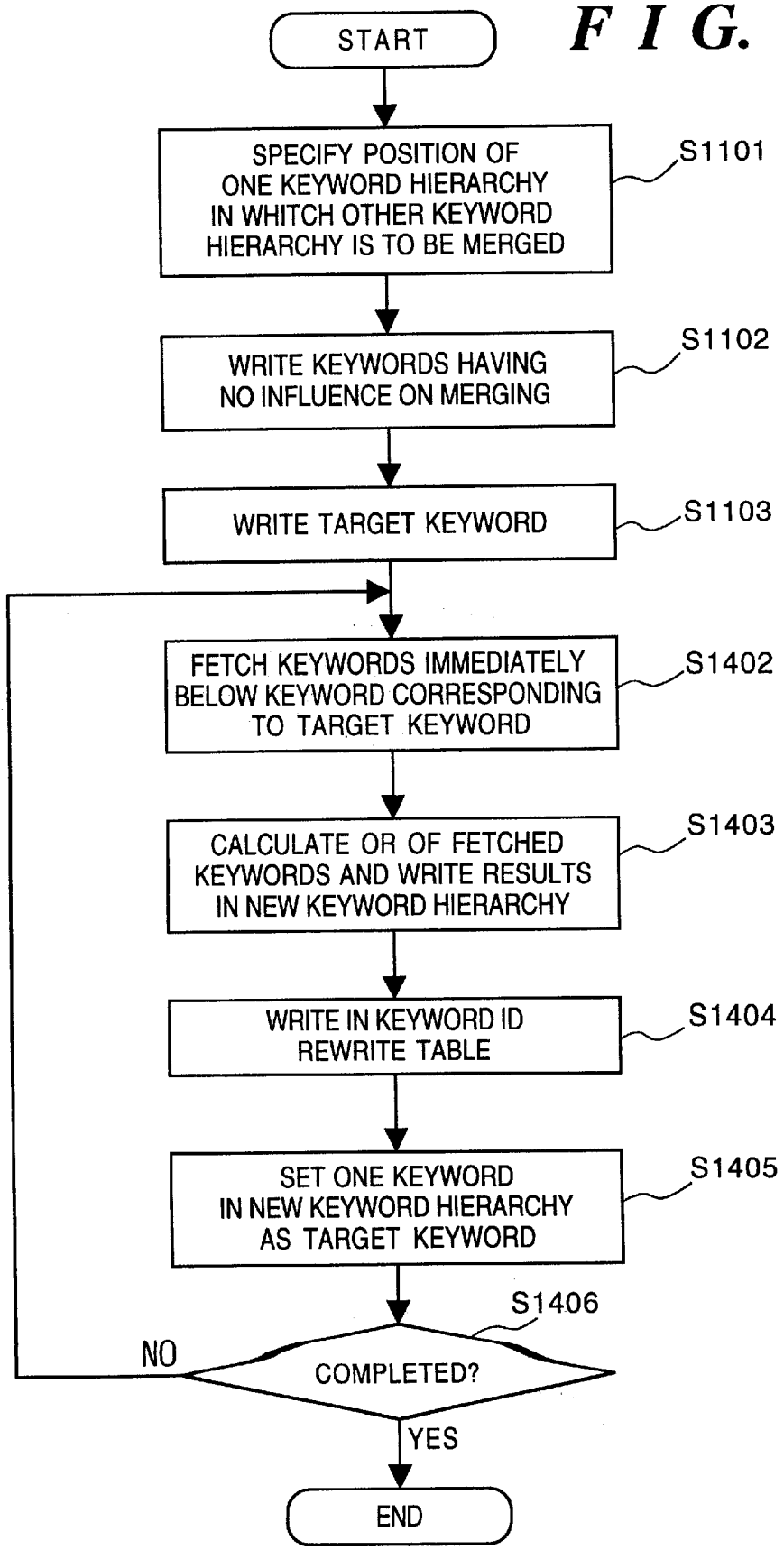
FIG. 17 is a flow chart showing another procedure of merging of the keyword storages in this embodiment.

FIG. 17 is a flow chart showing this procedure of merging the keyword storages, and the procedure will be described with reference to FIG. 17. In FIG. 17, steps of performing the same manipulations as in FIG. 8 which shows the keyword storage merging procedure of merging example 1 are denoted by the same reference numerals as in FIG. 8, and a detailed description thereof will be omitted. The procedure will be described by taking merging of a data library keyword hierarchy shown in FIG. 18 and the user keyword hierarchy in FIG. 9 as an example.

In step S1101, the user specifies, from the input unit 103, a position of one keyword hierarchy in which the other keyword hierarchy is to be merged. For example, to merge the data library keyword hierarchy, FIG. 18, in the level immediately below the keyword 2201 of the user keyword hierarchy, FIG. 9, the user specifies in step S1101 that the root of the data library keyword hierarchy is to be merged in the keyword "nature" 2201 of the user keyword hierarchy.

In step S1102, the keyword adder 117 writes keywords having no effect on the merging into the new keyword storage 115 and sequentially assigns keyword IDs from "#1" to these keywords. In the example previously described, keywords having no influence on the merging are keywords 2207, 2208, 2211, 2209, 2210, 2211, and 2212 in FIG. 9. Accordingly, new keywords IDs are assigned to these keywords and written into the new keyword storage 115. The result is shown in FIG. 19.

In step S1103, the keyword adder 117 writes the keyword, which is specified by the user in step S1101 and indicates the position to be merged, into the new keyword storage 115 as the target keyword, and assigns a new keyword ID to this target keyword. In the previous example the new keyword hierarchy in this stage is as illustrated in FIG. 20.

Figure 8:
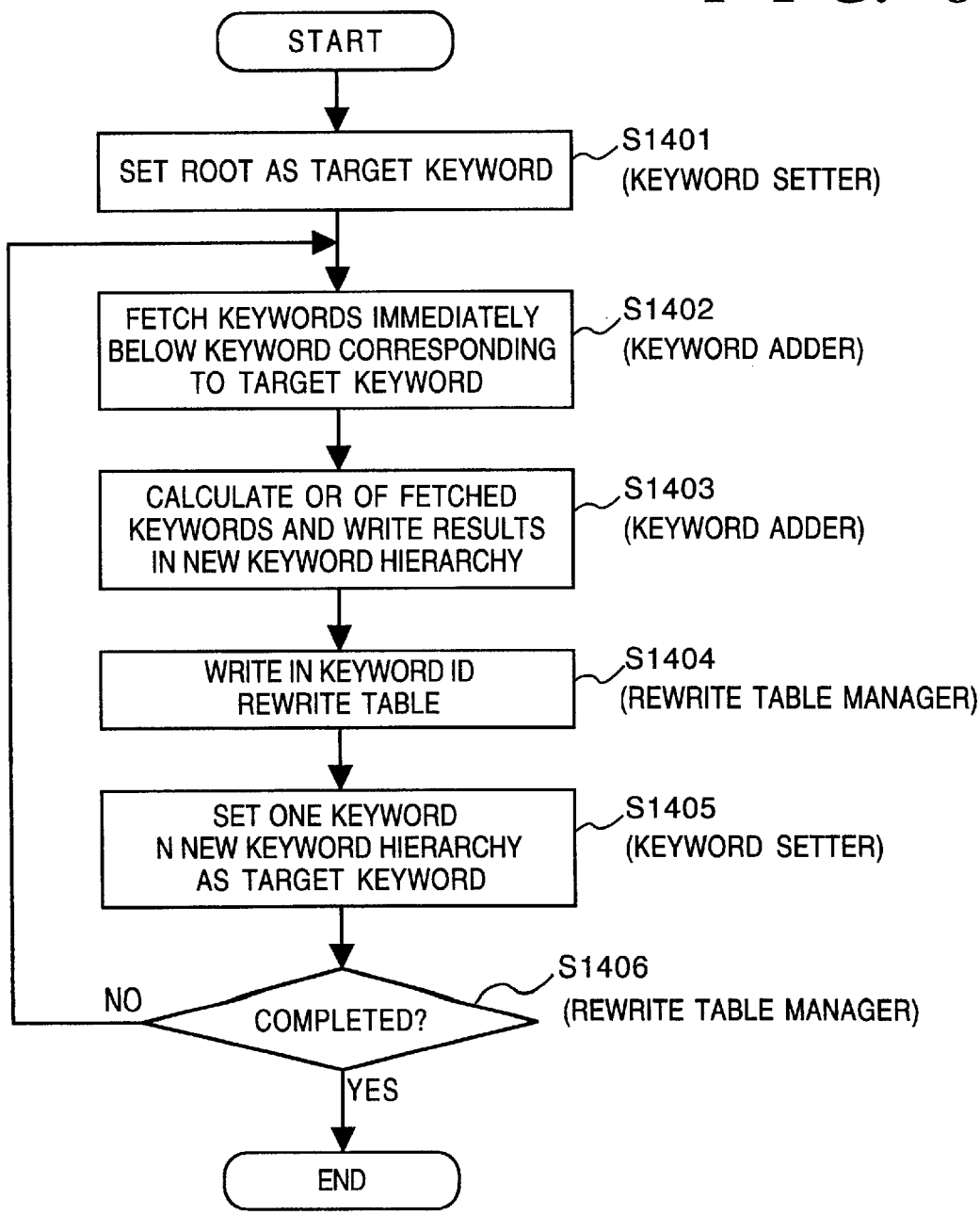
FIG. 8 is a flow chart showing a procedure of merging of keyword storages in this embodiment.

The subsequent operation is identical with the keyword storage merging procedure of merging example 1 in FIG. 8. That is, keywords corresponding to the target keyword are searched for from the user keyword storage and the data library keyword storage, keywords immediately below the two keyword sets are ORed, and the keywords are written into the new keyword storage 115.

Figure 21:
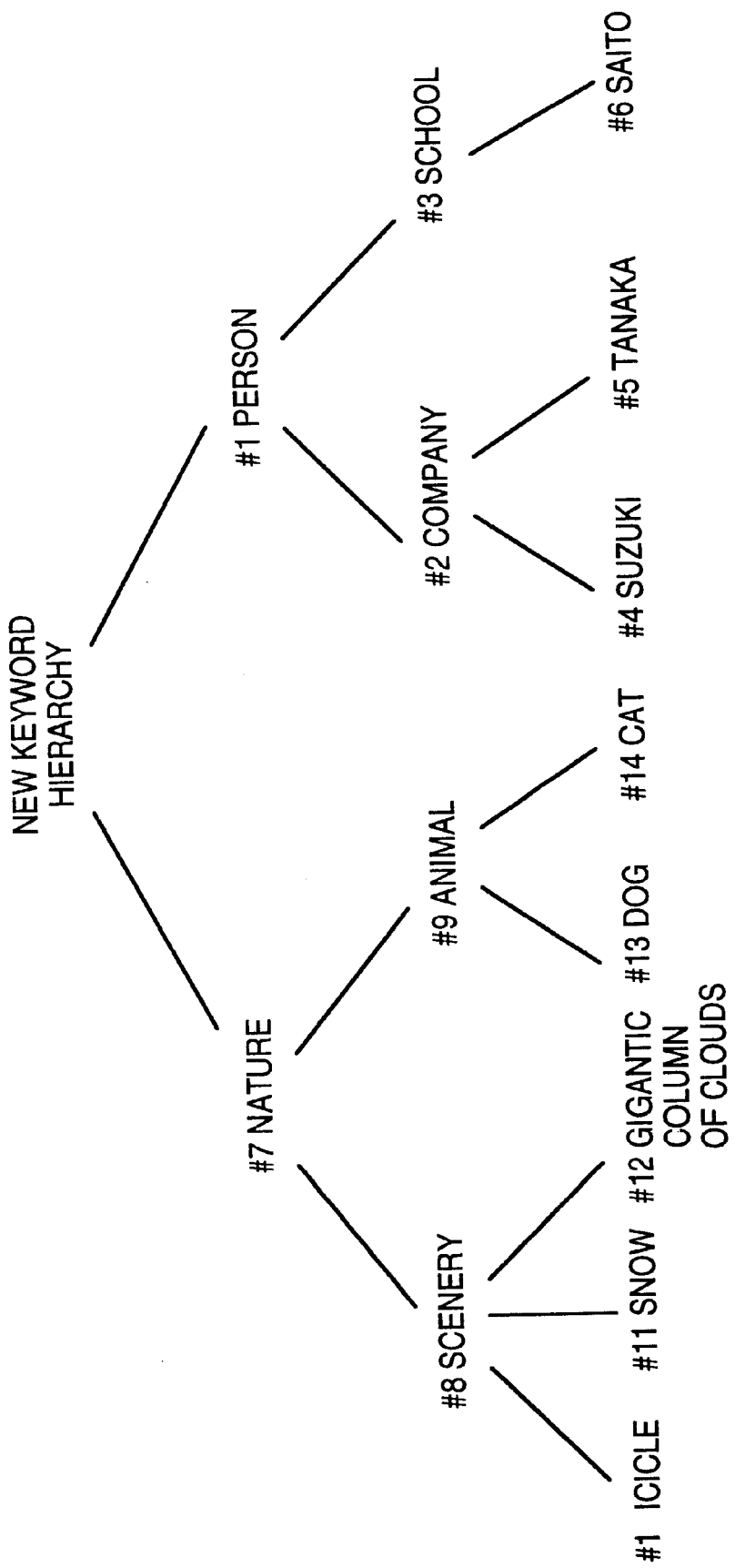
FIG. 21 is a view showing the result of merging of the data library attribute storage in FIG. 18 and the user attribute storage in FIG. 2 performed by the procedure in FIG. 17.

FIG. 21 shows the result of merging of the data library keyword hierarchy, FIG. 18, and the user keyword hierarchy, FIG. 9.

(Example 3 of merging of keyword storages)

Still another example of the keyword storage merging procedure will be described below.

Figure 22:
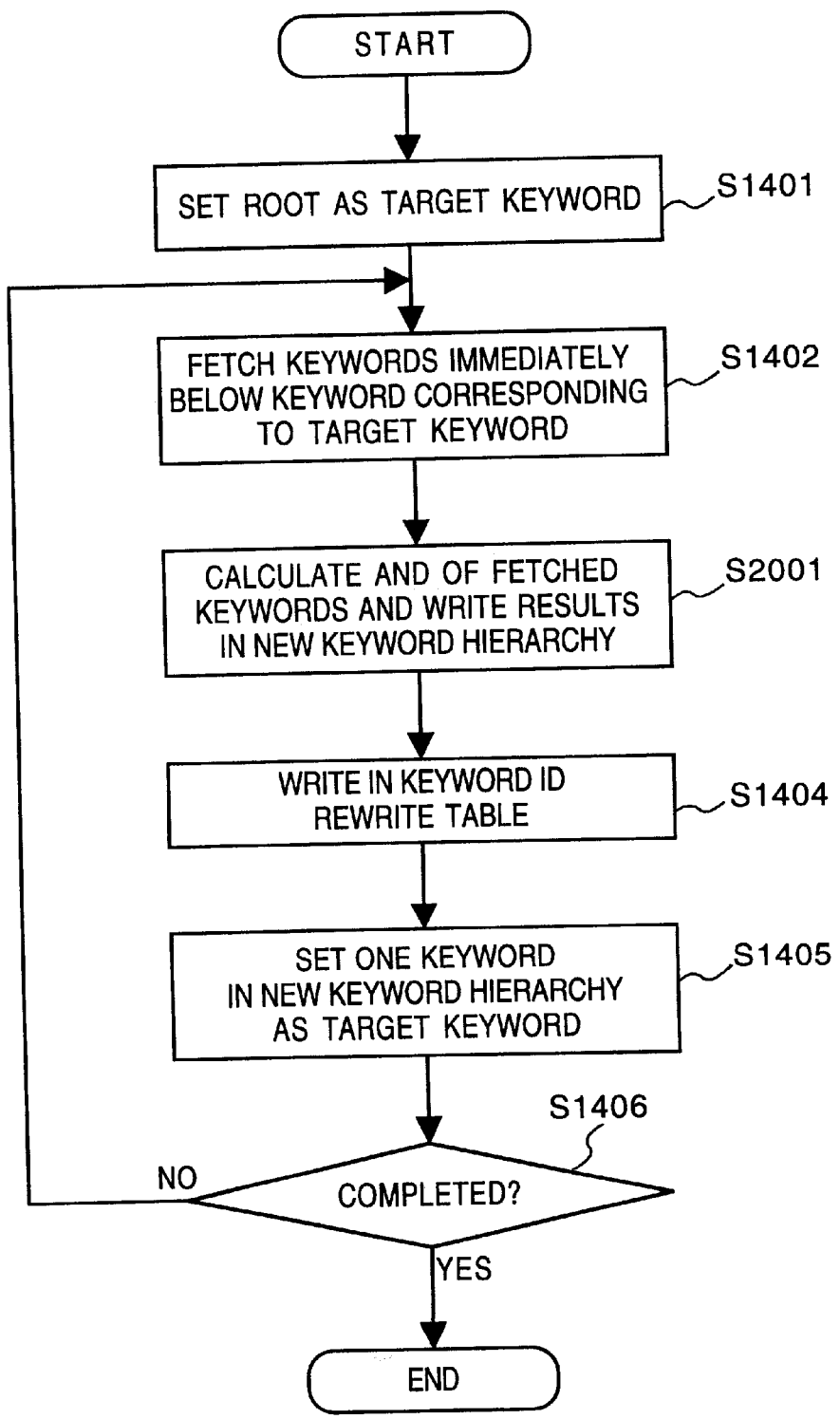
FIG. 22 is a flow chart showing still another procedure of merging of the keyword storages in this embodiment.

FIG. 22 is a flow chart showing this procedure of merging the keyword storages, and the procedure will be described with reference to FIG. 22. In FIG. 22, steps of performing the same manipulations as in FIG. 8 which shows the keyword storage merging procedure of merging example 1 are denoted by the same reference numerals in FIG. 8, and a detailed description thereof will be omitted.

The difference of FIG. 22 from FIG. 8 is that in step S2001 the keyword adder 177 performs an AND operation, instead of an OR operation, for the two keyword sets fetched in step S1402. Consequently, keywords contained in the user keyword storage 108 and also contained in the data library keyword storage 112 are written into the new keyword storage 115.

Figure 23:
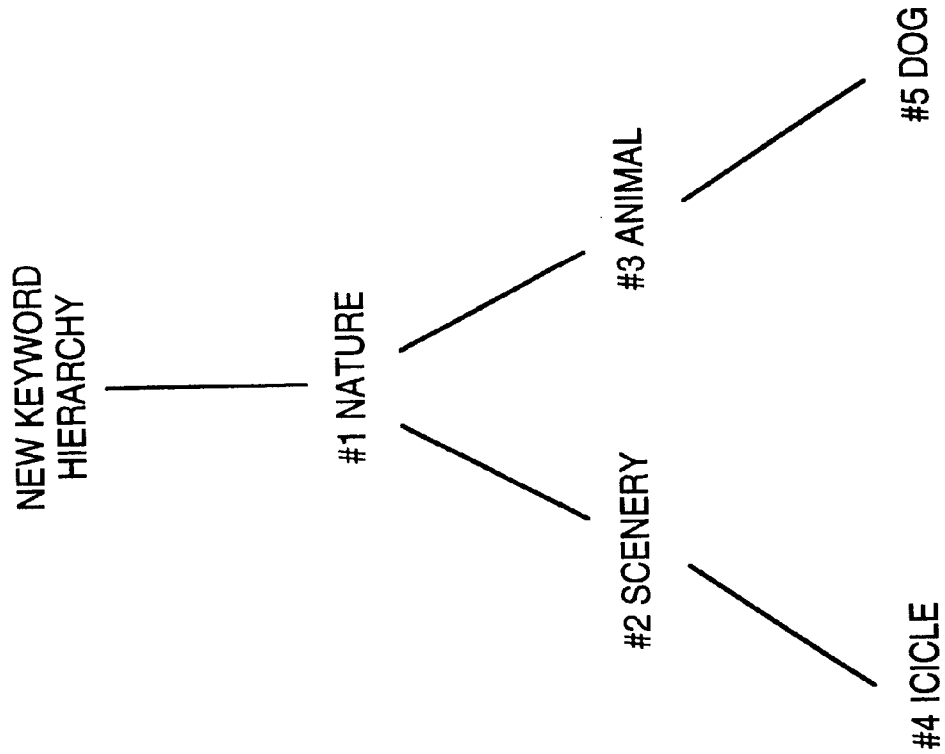
FIG. 23 is a view showing the result of merging of the user keyword storage in FIG. 9 and the data library keyword storage in FIG. 10 performed by the procedure in FIG. 22.

FIG. 23 shows the result when the user keyword storage 108, FIG. 9, and the data library keyword storage 112, FIG. 10, are merged in accordance with the above method.

(Example 4 of merging of keyword storages)

Still another example of the keyword storage merging procedure will be described below.

Figure 24:
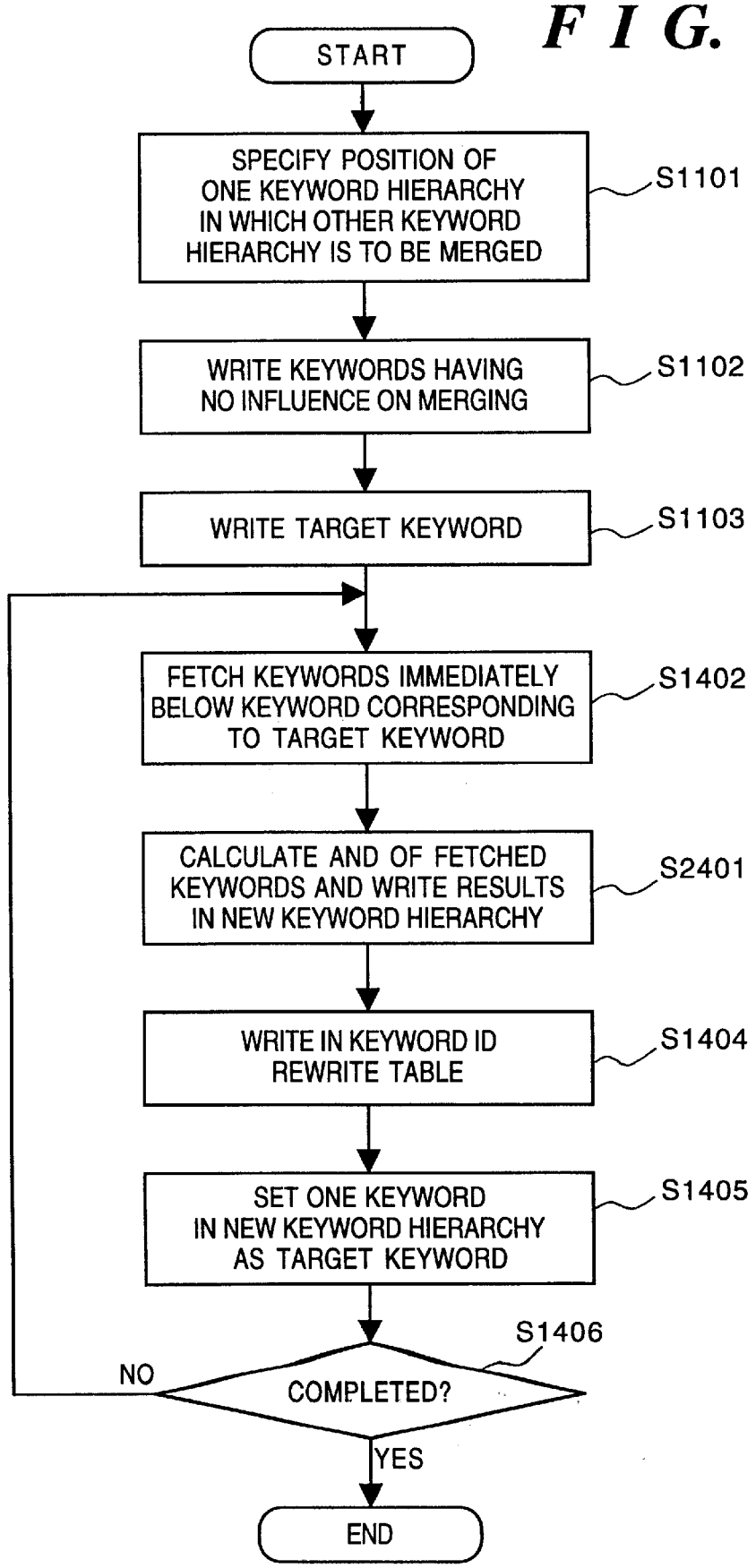
FIG. 24 is a flow chart showing still another procedure of merging of the keyword storages in this embodiment.

FIG. 24 is a flow chart showing this procedure of merging the keyword storages, and the procedure will be described with reference to FIG. 24. In FIG. 24, steps of performing the same manipulations as in FIG. 17 which shows the keyword storage merging procedure of merging example 2 are denoted by the same reference numerals as in FIG. 17, and a detailed description thereof will be omitted.

FIG. 24 differs from FIG. 17 in that in step S2401 the keyword adder 117 performs an AND operation, instead of an OR operation, for the two keyword sets fetched in step S1402. Consequently, keywords contained in the user keyword storage 108 and also contained in the data library keyword storage 112 are written into the new keyword storage 115.

The result when the data library keyword storage 112, FIG. 18, is merged immediately below the keyword 2201 of the user keyword storage 108, FIG. 9, in accordance with the above method is the same as FIG. 22 used in merging example 3 described above.

Example 2 of Configuration of Data Management System

Figure 25:
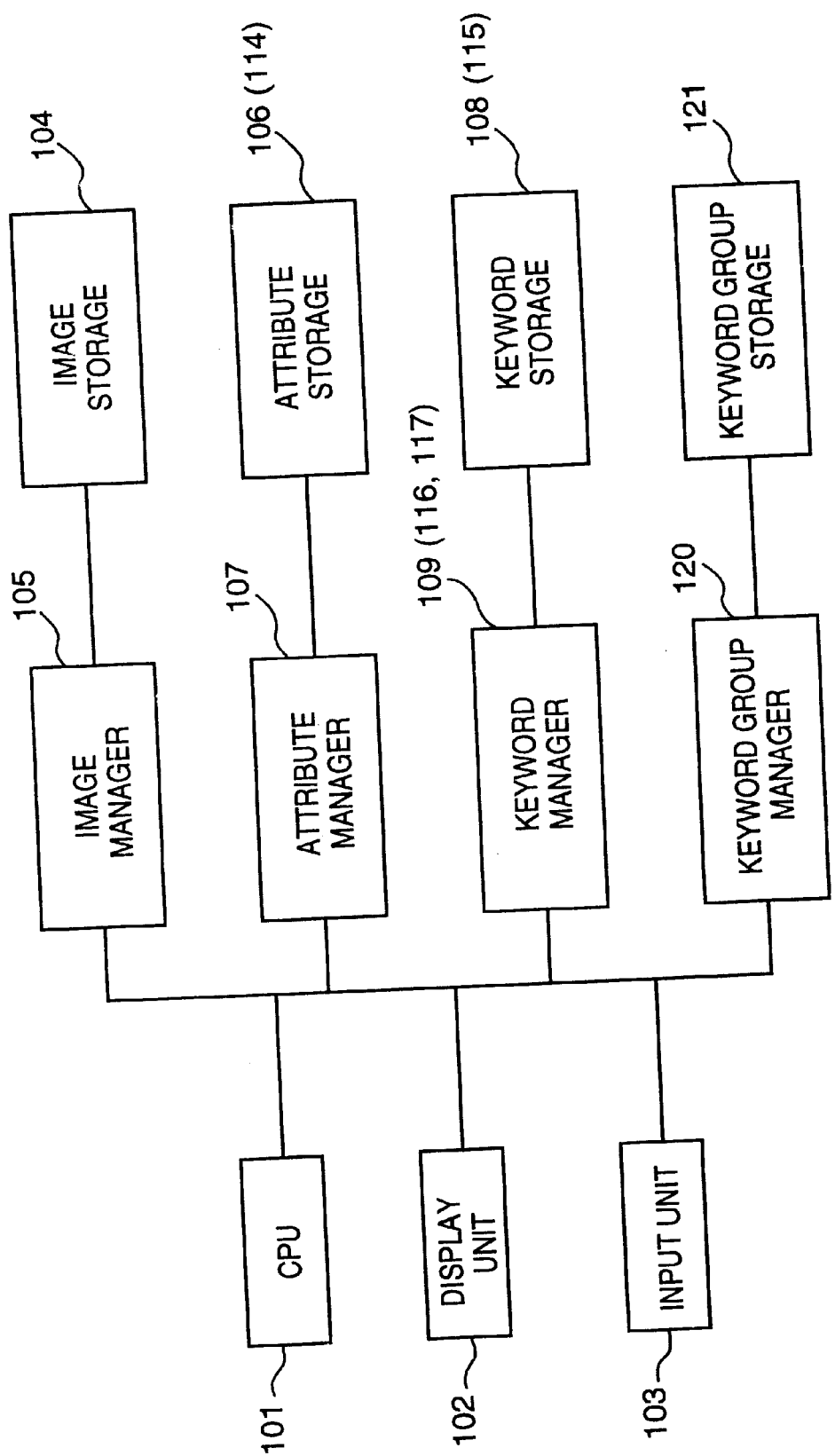
FIG. 25 is a view showing another example of the configuration of the data management system according to this embodiment.

FIG. 25 is a block diagram showing another example of the configuration of the data management system of this embodiment. The same reference numerals as in FIG. 1 denote parts having the same functions in FIG. 25, and a detailed description thereof will be omitted.

Figure 26:
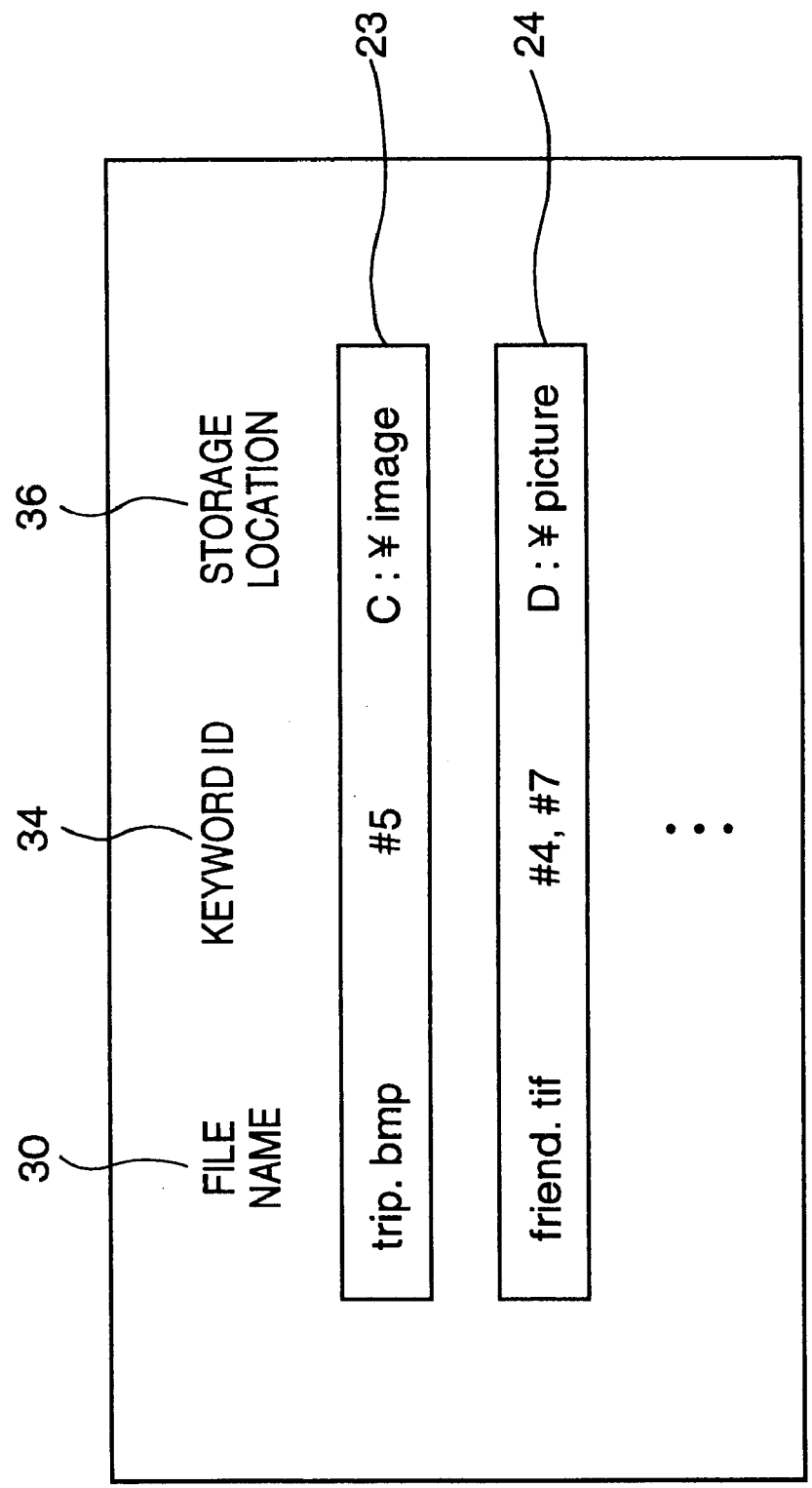
FIG. 26 is a view showing an example of the contents of an attribute storage.

Referring to FIG. 25, an attribute storage 106 or 114 stores attributes pertaining to each image stored in an image storage 104. For example, the attribute storage 106 or 114 has the configuration as shown in FIG. 26. In FIG. 26, file name 30, keyword ID 34, and storage location 36 are provided as image data attributes and made correspond to each image in the image storage 104. The keyword ID 34 is a number uniquely representing a keyword used to retrieve an image. The keyword ID 34 is defined in a keyword storage 108 (115) to be described later. The storage location 36 indicates a location where actual image data is stored. The storage location 36 is represented by the drive name and the directory name.

Figure 27:
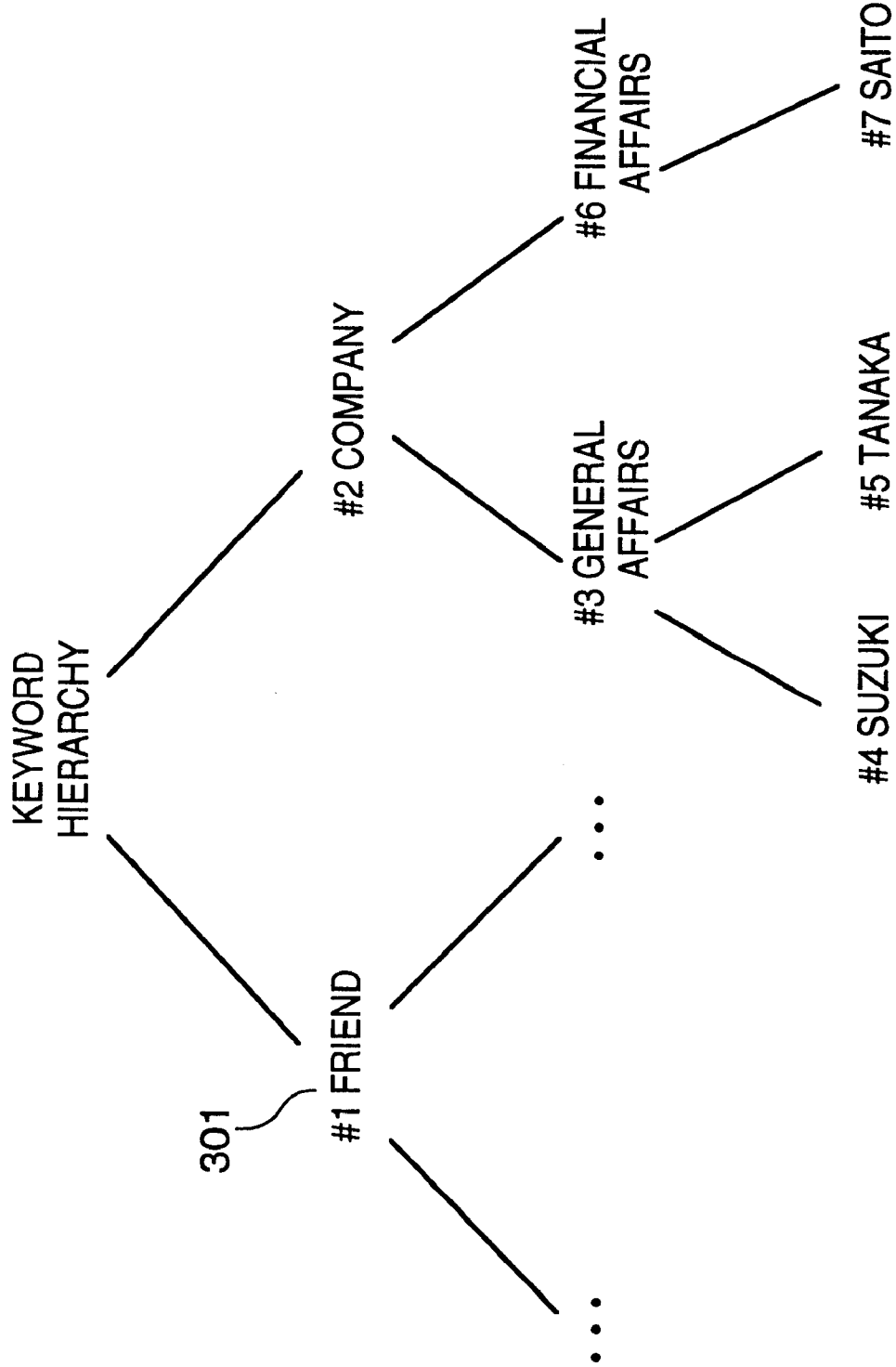
FIG. 27 is a view showing an example of the contents of a keyword storage.

The keyword storage 108 or 105 in FIG. 25 stores keywords added to the images in the image storage 104 in order to facilitate retrieval of the images. For example, the keyword storage 104 and 115 has the configuration as shown in FIG. 27. In FIG. 27, each of keywords 301 to 307 consists of a keyword ID (a number on the left side) and a keyword name (a character string on the right side). As an example, the keyword ID of the keyword 301 is "1" and its keyword name is "friend". The keyword ID is a specific number which each keyword has, and the keyword name is a character string representing the name of the keyword. Keywords are hierarchized in accordance with the conceptional classes of the keywords, and in this way the keywords are arranged. The correspondence between images and keywords assigned to the images is described in the attribute storage 106 (114) as described above.

Figure 28:
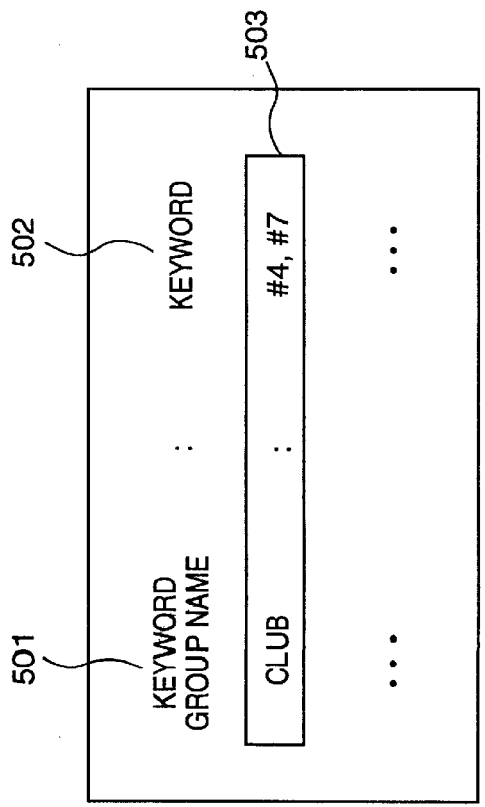
FIG. 28 is a view showing an example of the contents of a keyword group storage.

In FIG. 25, a keyword group storage 121 stores a plurality of keywords stored in the keyword storage 108 as one group in accordance with designation from the user. For example, the keyword group storage 121 has the configuration as illustrated in FIG. 28. In FIG. 28, reference numeral 501 denotes a keyword group name representing the name of a group of keywords; and 502, the ID of a keyword belonging to the keyword group. In this example, keyword ID #4 and keyword ID #7 belong to a keyword group name "club". A keyword group manager 120 in FIG. 25 refers to or writes keyword groups in the keyword group storage 121.

The image storage 104, the attribute storage 106, the keyword storage 108, and the keyword group storage 121 exist as data in a rewritable RAM (not shown). An image manager 105, an attribute manager 107, a keyword manager 109 (116, 117), and the keyword group manager 120 exist as programs in a ROM or RAM (not shown). As in the system configuration example 1 described earlier, all or some of these data and programs can be loaded from an external storage medium or a host into a RAM.

Example 2 of Operation of Data Management System

The operation of this embodiment will be described below.

(Formation of keyword group storage)

Figure 29:
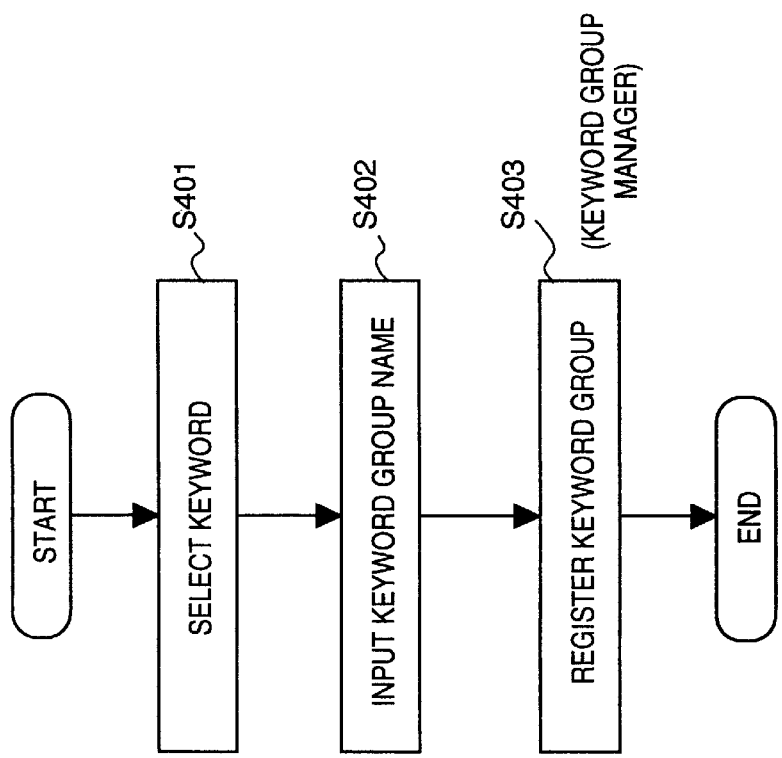
FIG. 29 is a flow chart showing a procedure of registering a keyword group.

A procedure of forming the keyword group storage 121 in FIG. 25 will be described below. The user can group some of keywords contained in the keyword storage 108 if the keywords have a close relationship to each other or it seems convenient to handle them as one group. FIG. 29 is a flow chart showing this procedure, and the procedure will be described with reference to FIG. 29.

In step S401, the user selects keywords to be grouped from an input unit 103 shown in FIG. 25. Assume, for example, that the user selects, as objects to be grouped, the keyword "Suzuki" 304 and the keyword "Saito" 307, FIG. 27, which represent Mr. Suzuki and Mr. Saito as the members of the same club as the user's. In step S402, the user inputs a keyword group name from the input unit 103. In this case the user inputs "club".

In step S403, the keyword group manager 120, FIG. 25, writes the keyword IDs of the selected keywords as one group into the keyword group storage 121, and also writes the name input in step S402 as the keyword group name. That is, in this example the keyword group manager 120 writes in the keyword group storage 121 the information indicating that the keyword "Suzuki" 304 and the keyword "Saito" 307 belong to the group with the group name "club". FIG. 28 shows the result of this operation.

(Example of procedure of making keywords correspond to images)

Figure 30:
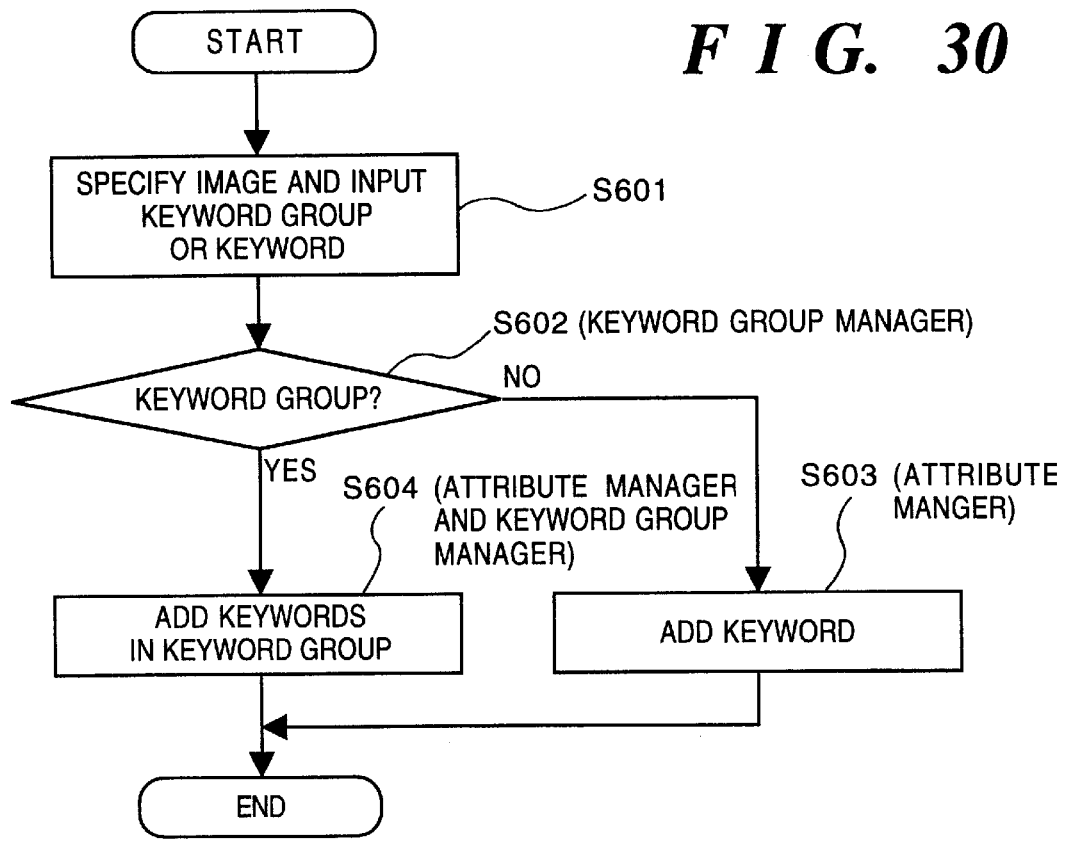
FIG. 30 is a flow chart showing a procedure of adding a keyword and a keyword group to an image.

A procedure of making keywords correspond to images will be described below. The user can add keywords in the keyword storage 108 or keyword groups in the keyword group storage 121 to images. FIG. 30 is a flow chart showing this procedure, and the procedure will be described with reference to FIG. 30.

In step S601, the user specifies, from the input unit 3, an image to which a keyword is to be added, and inputs a keyword group or keyword to be added to the image. In step S602, the keyword group manager 120 checks whether the data to be added to the image is a keyword group.

If the data is not a keyword group, the flow advances to step S603, and the attribute manager 107 writes the correspondence between the keyword ID of the specified keyword and the image into the attribute storage 106. For example, when the keyword 305 in FIG. 27 is added to the image, contents as denoted by reference numeral 23 in FIG. 26 are written in the attribute storage 106 in FIG. 25.

If the keyword group manager 120 determines in step S602 that a keyword group is input in step S601, the flow advances to step S604, and the keyword group manager 120 fetches all keywords in the specified keyword group from the keyword group storage 121. The attribute manager 107 writes the correspondence between the keyword IDs of the fetched keywords and the image into the attribute storage 106. For example, when a keyword group 503 in FIG. 28 is added to the image, contents as denoted by reference numeral 24 in FIG. 26 are written in the attribute storage 106.

(Procedure of retrieving image by using keywords)

Figure 31:
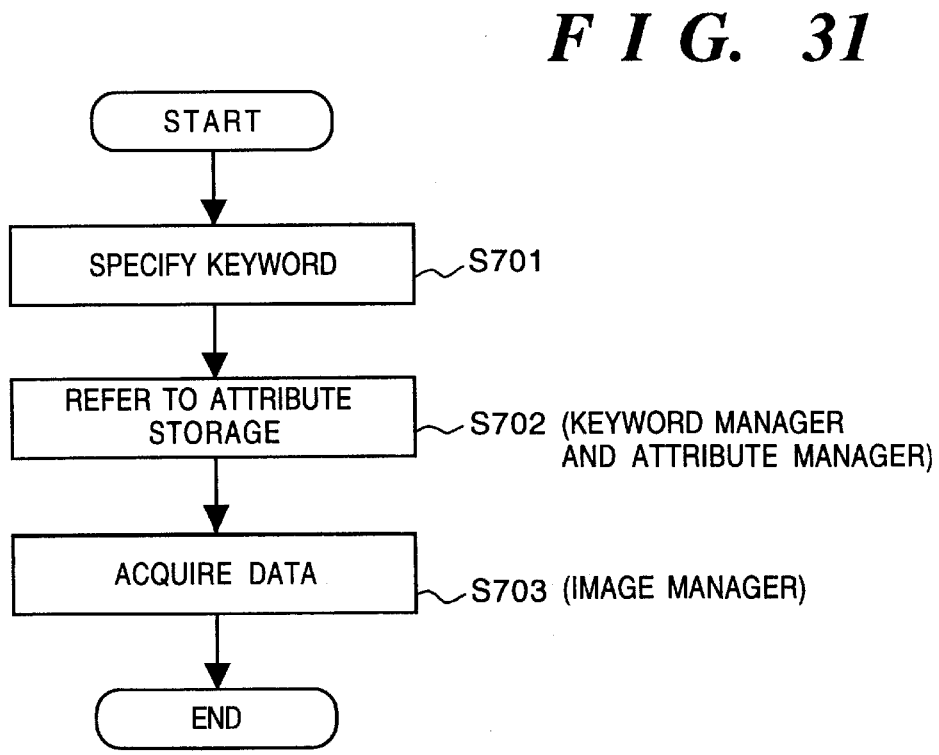
FIG. 31 is a flow chart showing a procedure of retrieving an image by using a keyword.
Figure 32:
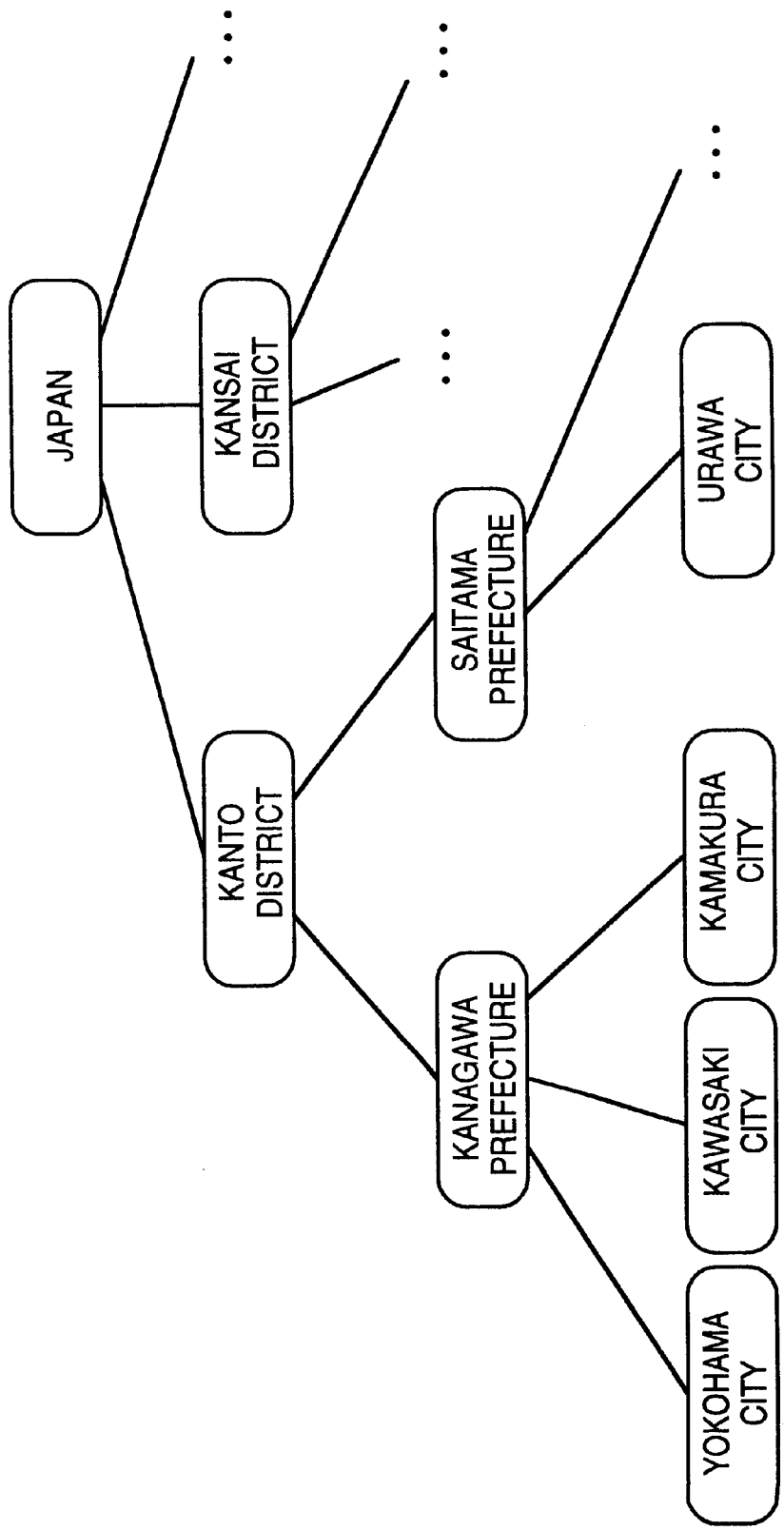
FIG. 32 is a view showing an-example of a keyword hierarchy.

Another procedure by which the user retrieves an image by using keywords will be described below. FIG. 31 is a flow chart showing this procedure, and the procedure will be described with reference to FIG. 31.

In step S701, the user specifies a keyword for retrieval from the input unit 3. In step S702, the keyword manager 109 refers to the attribute storage 106 via the attribute manager 107 and searches for the storage location of an image added with the specified keyword. As an example, when the keyword 307 in FIG. 27 is specified in step S701, the keyword manager 109 refers to the contents of the attribute storage 106, FIG. 26, and searches a file name "friend.tif" whose storage location is "D:¥picture".

In step S703, the image manager 105 searches for corresponding data from the image storage 104 and displays the data on a display unit 102, thereby informing the user that the data of interest is found.

Note that although the configuration examples 1 and 2 of this embodiment are explained independently of each other, the combination of the configuration examples 1 and 2 also is possible. Note also that image data is used as data to be managed in this embodiment, but it is obvious that the present invention is applicable to data other than image data.

The managers in the configuration examples 1 and 2 need not be realized by programs which can be definitely separated. That is, a plurality of managers can be inseparably merged into a single program module, or a single manager can be distributed to a plurality of program modules. FIGS. 1 and 25 merely illustrate examples of the configuration of the present invention so as to facilitate the understanding of the invention.

The present invention can be applied to a system constituted by a plurality of devices (e.g., a host computer and an interface) or to an apparatus comprising a single device as shown in FIG. 1.

Example of Loading of Programs or Data

As described above, the objects of the present invention can also be achieved when a storage medium recording program codes of software which realizes the functions of the embodiment is supplied to a system or an apparatus, and a computer (or a CPU or an MPU) of the system or the apparatus reads out and executes the program codes stored in the storage medium.

If this is the case, the program codes themselves read out from the storage medium realize the functions of the embodiment described previously, and the storage medium storing these program codes constitutes the present invention.

As the storage medium for supplying the program codes, it is possible to use, e.g., a floppy disk, a hard disk, an optical disk, a magneto-optical disk, a CD-ROM, a CD-R, a magnetic tape, a nonvolatile memory card, or a ROM.

The present invention involves not only a case where the functions of the above embodiment are effectuated by the execution of program codes read out by a computer but also a case where an OS (Operating System) operating on a computer performs some or all of actual processes in accordance with instructions from program codes and the functions of the above embodiment are achieved by these processes.

Furthermore, the present invention involves a case where program codes read out from a storage medium are written in a memory of a function expansion board inserted into a computer or a memory of a function expansion unit connected to the computer, a CPU or the like of the function expansion board or the function expansion unit performs some or all of actual processes in accordance with instructions from the program codes, and the functions of the above embodiment are realized by these processes.

Figure 33:
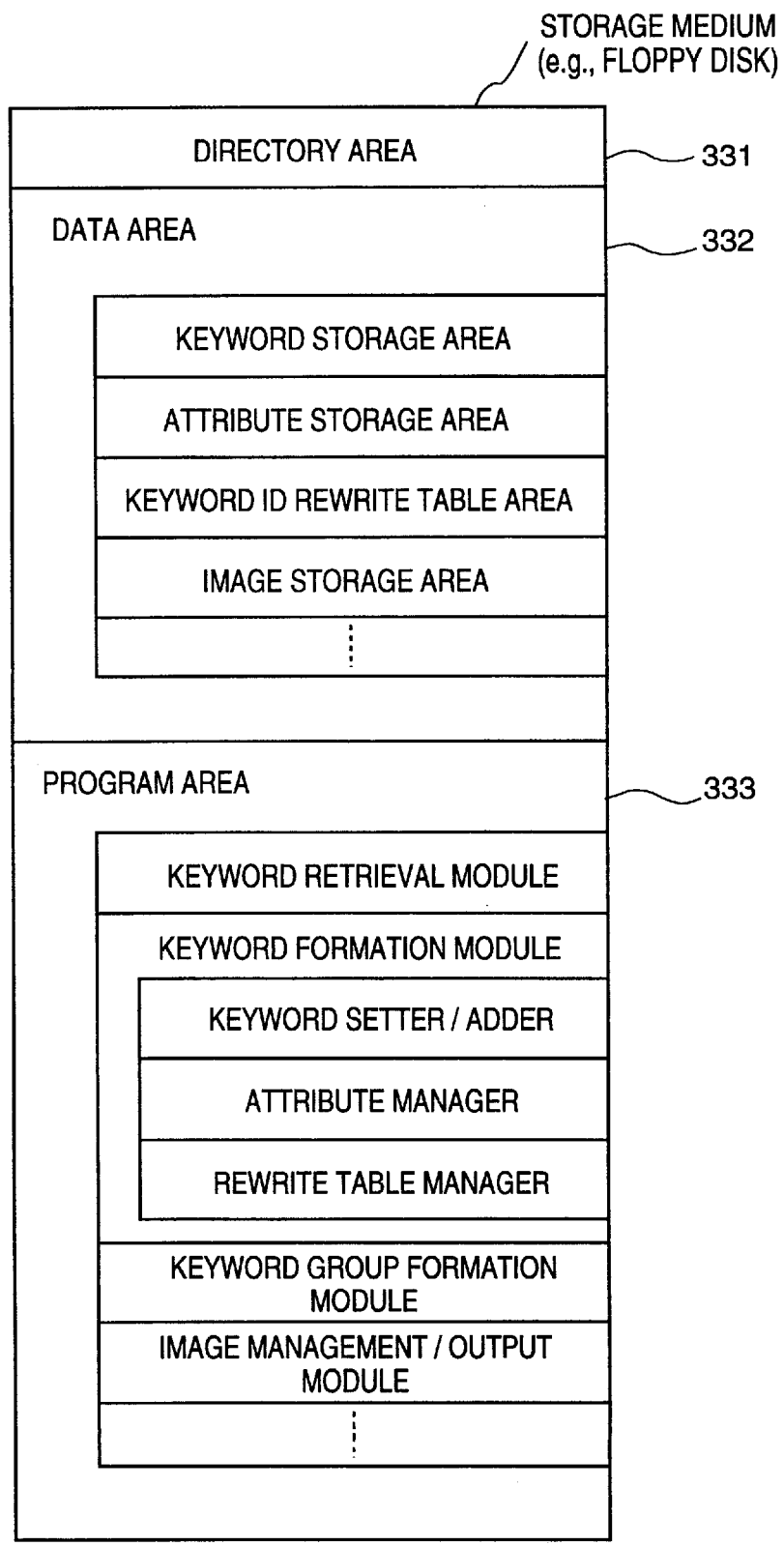
FIG. 33 is a view showing an example of the configuration of data or programs stored in a floppy disk in this embodiment.

FIG. 33 shows an example of the configuration of a storage medium such as a floppy disk.

The storage medium is roughly divided into a directory area 331, a data area 332, and a program area 333. The directory area 331 stores the storage location of each information.

The data area 332 includes a keyword storage area, an attribute storage area, a keyword ID rewrite table area, and an image storage area. The data area 332 can also contain the data library 110.

The program area 333 has a keyword retrieval module, a keyword formation module which includes a keyword setter/ adder, an attribute manager, and a rewrite table manager, a keyword group formation module, and an image management/output module, in various forms such as program codes and process flows.

Note that the storage medium can be separated into a storage medium for storing only programs and a storage medium for storing only data.

In the present invention as has been described above, a plurality of keyword storages and a plurality of attribute storages can be merged into one storage. Consequently, it is possible to retrieve data in a plurality of data storages by using one keyword and one attribute. Additionally, a logical operation (e.g., an OR or AND operation) is performed for keyword sets when merging is executed. Accordingly, a keyword hierarchy meeting the demand of the user can be formed from a plurality of keyword storages.

Also, in the present invention a keyword hierarchy can be merged in a position, which is found to be appropriate by the user, by specifying the merging position in a keyword storage. This makes it possible to form a keyword hierarchy meeting the demand of the user and prevent the formation of a meaningless keyword hierarchy.

Furthermore, in the present invention a plurality of keywords can be registered as a group. Accordingly, some of the hierarchized keywords can be processed as a single group if the keywords have a close relationship to each other or it seems convenient to handle them as a single group.

That is, if some of the hierarchized keywords have a close relationship to each other or it seems convenient to handle them as a single group, these keywords can be added in units of groups to images. This reduces the work of adding keywords to images.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments. Briefly, the storage medium stores each module shown as an example of a memory map in FIG. 33. More specifically, program codes which correspond to keyword retrieval module, keyword formation module, keyword group formation module and image management/output module, at least, are to be stored in the storage medium.

As many apparently widely different embodiments of the present invention can be made without departing from the spirit and scope thereof, it is to be understood that the invention is not limited to the specific embodiments thereof except as defined in the appended claims.

What is claimed is:

1. A data management method of managing data comprising the steps of:

forming first and second groups of keywords, each group containing one or more keywords hierarchized in accordance with classes of objects to be managed such that the keywords in each group are arranged as a top keyword and other keywords below in a hierarchy, wherein each keyword above another keyword is a parent keyword for any keyword therebelow, wherein each keyword immediately above another keyword is an immediate parent keyword for any keyword immediately therebelow, and wherein each keyword has a respective keyword name associated therewith;

designating a merge of the first and second groups;

when either one of the first and second groups is designated, assigning a plurality of the keywords in a designated group to data and storing the data;

extracting, from the first and second groups, a keyword having a same keyword name and having all its ascendant parents having same keyword names respectively;

performing a logical OR operation, based on respective keyword names, between a respective sets of keywords in the first and second groups having the extracted keywords as a same immediate parent; and forming a third keyword group hierarchically rearranged in accordance with classes of objects on a basis of the logical OR operation, as a new keyword group different from the first and second groups, containing the keywords of the first and second groups, by repeating the extracting and logical OR operation steps in each of the hierarchical levels.

2. The method according to claim 1, wherein when retrieval using a specified keyword is designated, data assigned to the specified keyword is retrieved.

3. A data management system for managing data comprising:

means for forming first and second groups of keywords, each group containing one or more keywords hierarchized in accordance with classes of objects to be managed such that the keywords in each group are arranged as a top keyword and other keywords below in a hierarchy, wherein each keyword above another keyword is a parent keyword for any keyword therebelow, wherein each keyword immediately above another keyword is an immediate parent keyword for any keyword immediately therebelow, and wherein each keyword has a respective keyword name associated therewith;

means for designating a merge of the first and second groups;

means for, when either one of the first and second groups is designated, assigning a plurality of the keywords in each group to data;

means for storing the assigned data;

means for extracting, from the first and second groups, a keyword having a same keyword name and having all its ascendant parents having same keyword names respectively;

means for performing a logical OR operation based on respective keyword means, between a respective sets of keywords in the first and second groups having the extracted keyword as a same immediate parent; and means for forming a third keyword group hierarchically rearranged in accordance with classes of objects on the basis of the logical OR operation, as a new keyword group different from the first and second groups, containing the keywords of the first and second groups by repeating the extracting by said extracting means and logical OR operation by said logical OR operation means in each of hierarchical levels.

4. The system according to claim 3, wherein when retrieval using a specified keyword is designated, data assigned to the specified keyword is retrieved.

5. A data management system for managing data, comprising:

first and second storage means for respectively storing first and second groups of keywords, each group containing one or more keywords hierarchized in accordance with classes of objects to be managed such that the keywords in each group are arranged as a top keyword and other keywords below in a hierarchy, wherein each keyword above another keyword is a parent keyword for any keyword therebelow, wherein each keyword immediately above another keyword is an immediate parent keyword for any keyword immediately therebelow, and wherein each keyword has a respective keyword name associated therewith;

designating means for designating a merge of the first and second groups;

keyword extracting means for extracting, from the first and second groups, a keyword having a same keyword name and having all its ascendant parents having same keyword names respectively;

logic means for performing a logical OR operation, based on respective keyword names, between respective sets of keywords in the first and second groups having the same immediate parent;

keyword group forming means for forming a third keyword group hierarchically rearranged in accordance with classes of objects on the basis of the logical OR operation, as a new keyword group different from the first and second groups, containing at least one of the keywords of the first group and at least one of the keywords of the second group, by repeating the extracting by said keyword extracting means and the logical OR operation by said logic means in each of the hierarchical levels; and third storage means for storing the third keyword group.

6. The system according to claim 5, wherein the logic operation includes AND and OR.

7. The system according to claim 5, further comprising means for specifying a keyword, wherein the logic operation is performed for keywords having the specified keyword as a parent and for a further group of keywords not having the specified keyword, and wherein in the formation of the third group, unique numbers are assigned to all keywords therein as respective keyword IDs.

8. The system according to claim 7, wherein the logic operation includes AND and OR.

9. A data management system comprising:

first and second data storage for respectively storing first and second data;

first and second keyword storage for respectively storing first and second groups of keywords, each group containing one or more keywords hierarchized in accordance with classes of objects to be managed such that the keywords in each group are arranged as a top keyword and other keywords below in a hierarchy, wherein each keyword above another keyword is a parent keyword for any keyword therebelow, wherein each keyword immediately above another keyword is an immediate parent keyword for any keyword immediately therebelow, and wherein each keyword has a respective keyword name associated therewith;

a first attribute storage for holding a first correspondence between the first data and the first group of keywords and for holding first storage locations of the first data in said first data storage, the first storage locations being uniquely determined in said system;

a second attribute storage for holding a second correspondence between the second data and the second group of keywords and for holding second storage locations of the second data in said second data storage, the second storage locations being uniquely determined in said system;

designating means for designating a merge of the first and second groups;

keyword extracting means for extracting, from the first and second groups, a keyword having a same keyword name and all its ascendant parents having same keyword names respectively;

keyword logic operation means for performing a logical OR operation, based on the respective keyword names, between respective sets of keywords in the first and second groups having the extracted keywords as a same immediate parent;

keyword forming means for forming a third group of keywords consisting of the keywords of the first and second groups hierarchically rearranged in accordance with classes of objects on a basis of the logical OR operation, as a new keyword group different from the first and second groups, by repeating the extracting by said keyword extracting means and the logical OR operations by said keyword logic operation means in each of the hierarchical levels, and for assigning, to each keyword in the third group, a unique number as keyword ID; and attribute forming means for forming a third correspondence between the first and second data and the keywords in the third group based on the first and second correspondences, the first and second storage locations and the keyword IDs.

10. The system according to claim 9, wherein the logical operation includes OR and AND.

11. The system according to claim 9, further comprising means for specifying a keyword from the first and second groups, wherein the logic operation is performed for keywords having the specified keyword as a parent and for a further group of keywords not having the specified keyword, and wherein said keyword formation means assigns unique numbers to all keywords, including those not included in the third group, as respective keyword IDs.

12. The system according to claim 11, wherein the logical operation includes OR and AND.

13. A data management system comprising:

means for providing first and second groups of keywords, each group containing one or more keywords hierarchized in accordance with classes of objects to be managed such that the keywords in each group are arranged as a top keyword and other keywords below in a hierarchy, wherein each keyword above another keyword is a parent keyword for any keyword therebelow, wherein each keyword immediately above another keyword is an immediate parent keyword for any keyword immediately therebelow, and wherein each keyword has a respective keyword name associated therewith;

designating means for designating a merge to the first and second groups;

extracting means for extracting, from the first and second groups a keyword having a same keyword name and having all its ascendant parents having same keyword names respectively;

logic means for performing a logical OR operation, based on respective keyword names, between a respective sets of keywords in the first and second groups having the extracted keyword as a same immediate parent;

a data storage for storing data;

a first keyword storage for storing the first group of keywords;

an attribute storage for holding a first correspondence between the data and the first group of keywords;

a second keyword storage for storing the second group of keywords;

an attribute manager for, when the keywords of one of the plurality of second groups are assigned to data in the data storage, writing a further correspondence between the data and the keywords in the second group into said attribute storage; and means for forming a third keyword group hierarchically rearranged in accordance with classes of objects on a basis of the logical OR operation, as a new keyword group different from the first and second groups, containing the keywords of the first and second groups, by repeating the extracting by said extracting means and the logical OR operation by said logic means in each of hierarchical levels.

14. A computer readable medium storing a program for performing a data management method of managing data, wherein first and second groups of keywords are provided, each group containing one or more keywords hierarchized in accordance with classes of objects to be managed such that the keywords in each group are arranged as a top keyword and other keywords below in a hierarchy, wherein each keyword above another keyword is a parent keyword for any keyword therebelow, wherein each keyword immediately above another keyword is an immediate parent keyword for any keyword immediately therebelow, and wherein each keyword has a respective keyword name associated therewith, said method comprising the steps of:

designating a designation of a merge of the first and second groups;

when the designation of the merge is detected, extracting, from the first and second groups, a keyword having a same keyword name and all its ascendant parents having the same keyword name;

performing a logical OR operation, based on respective keyword names, between respective sets of keywords in the first and second groups having the extracted keyword as a same immediate parent; and forming a third keyword group hierarchically rearranged in accordance with classes of objects on the basis of the logical OR operation, as a new keyword group different from the first and second groups, containing the keywords of the first and second groups, by repeating the extracting and logical OR operation steps in each of the hierarchical levels.

15. A medium according to claim 14, wherein said program further comprises the step of providing the first and second groups of keywords.

16. A medium according to claim 14, wherein said method further comprises the step of accessing, from a storage means, a data area including a keyword storage area, an attribute storage area, a keyword ID rewrite table area and an image storage area.

* * * * *

UNITED STATES PATENT AND TRADEMARK OFFICE
CERTIFICATE OF CORRECTION

PATENT NO. : 6,553,382 B2
DATED : April 22, 2003
INVENTOR(S) : Kenji Hatori et al.

It is certified that error appears in the above-identified patent and that said Letters Patent is hereby corrected as shown below:

Title page,
Item [56], References Cited, OTHER PUBLICATIONS,
"www.metapsy.com/top.html.*" should read -- www.metaspy.com/top.html* --; and "th" should read -- the --.

Drawings,
Sheet 14, "WHITCH" should read -- WHICH --.

Column 4,
Line 58, "and," should read -- and --.

Column 6,
Line 7, "an-example" should read -- an example --.

Column 12,
Line 14, "correspond" should read -- to correspond --.

Column 16,
Line 36, "a" should be deleted.

Column 17,
Line 7, "a" should be deleted.

Column 18,
Line 47, "operations" should read -- operation --.

UNITED STATES PATENT AND TRADEMARK OFFICE
CERTIFICATE OF CORRECTION

PATENT NO. : 6,553,382 B2
DATED : April 22, 2003
INVENTOR(S) : Kenji Hatori et al.

It is certified that error appears in the above-identified patent and that said Letters Patent is hereby corrected as shown below:

<u>Column 19,</u>
Line 21, "a" should be deleted.

Signed and Sealed this

Sixteenth Day of December, 2003

JAMES E. ROGAN
*Director of the United States Patent and Trademark Office*